(12) United States Patent  (10) Patent No.: US 8,625,209 B2
Sato et al.  (45) Date of Patent: Jan. 7, 2014

(54) IMAGING LENS, OPTICAL APPARATUS INCLUDING IMAGING LENS AND METHOD FOR MANUFACTURING IMAGING LENS

(75) Inventors: Haruo Sato, Kawaguchi (JP); Mami Muratani, Tokyo (JP)

(73) Assignee: Nikon Corporation, Tokyo (JP)

( * ) Notice: Subject to any disclaimer, the term of this patent is extended or adjusted under 35 U.S.C. 154(b) by 51 days.

(21) Appl. No.: 13/035,334

(22) Filed: Feb. 25, 2011

(65) Prior Publication Data

US 2011/0211263 A1 Sep. 1, 2011

(30) Foreign Application Priority Data

Feb. 26, 2010 (JP) ................................ 2010-042006

(51) Int. Cl.
*G02B 9/12* (2006.01)
*G02B 13/18* (2006.01)

(52) U.S. Cl.
USPC .......................................... 359/784; 359/716

(58) Field of Classification Search
USPC ........................... 359/693, 705, 784, 823, 716
See application file for complete search history.

(56) References Cited

U.S. PATENT DOCUMENTS

| 4,772,108 | A | 9/1988 | Sugiyama |
| 6,891,684 | B2 | 5/2005 | Taki |
| 7,215,481 | B2 | 5/2007 | Ogata |
| 7,715,118 | B2 | 5/2010 | Kato |
| 8,179,617 | B2 | 5/2012 | Sugita |
| 2001/0028511 | A1* | 10/2001 | Sensui ........................... 359/689 |
| 2004/0017617 | A1 | 1/2004 | Taki |
| 2005/0057819 | A1* | 3/2005 | Eguchi .......................... 359/680 |
| 2005/0134968 | A1 | 6/2005 | Ogata |
| 2008/0247058 | A1 | 10/2008 | Kato |
| 2010/0208367 | A1 | 8/2010 | Sugita |
| 2011/0211267 | A1* | 9/2011 | Takato .......................... 359/784 |

FOREIGN PATENT DOCUMENTS

| JP | 60-188918 A | 9/1985 |
| JP | 62-160412 A | 7/1987 |
| JP | 07-181390 A | 7/1995 |
| JP | 2000-056217 A | 2/2000 |
| JP | 2004-061680 A | 2/2004 |
| JP | 2005-181852 A | 7/2005 |
| JP | 2008-020656 A | 1/2008 |
| JP | 2008-257088 A | 10/2008 |
| JP | 2008-298840 A | 12/2008 |
| JP | 2010-191077 A | 9/2012 |

* cited by examiner

*Primary Examiner* — William Choi
(74) *Attorney, Agent, or Firm* — Miles & Stockbridge P.C.

(57) ABSTRACT

An imaging lens SL mounted in a digital single lens reflex camera 1 is composed of, in order from an object side, a first lens group G1 having negative refractive power, a second lens group G2 having positive refractive power, and a third lens group G3 having positive refractive power, wherein upon focusing on a near-distance object point from an infinite-distance object point, at least one of the first lens group G1 and the second lens group G2 is moved so as to change a distance between the first lens group G1 and the second lens group G2, and the imaging lens satisfies a given conditional expression, thereby providing a downsized imaging lens suited to an imaging apparatus such as a single lens reflex camera, having a less of change in overall length and optimal to driving an intra-lens-barrel motor.

29 Claims, 12 Drawing Sheets

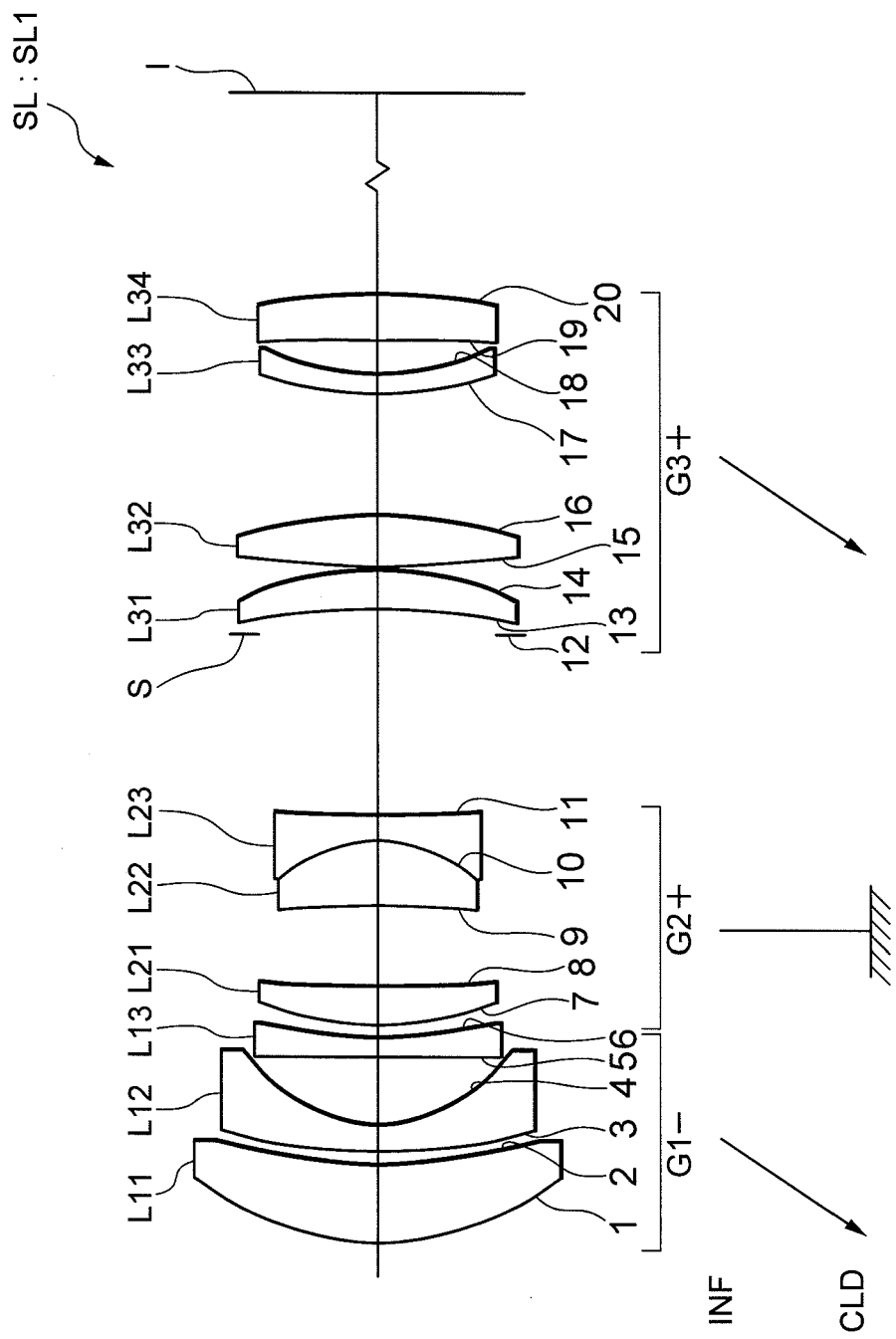

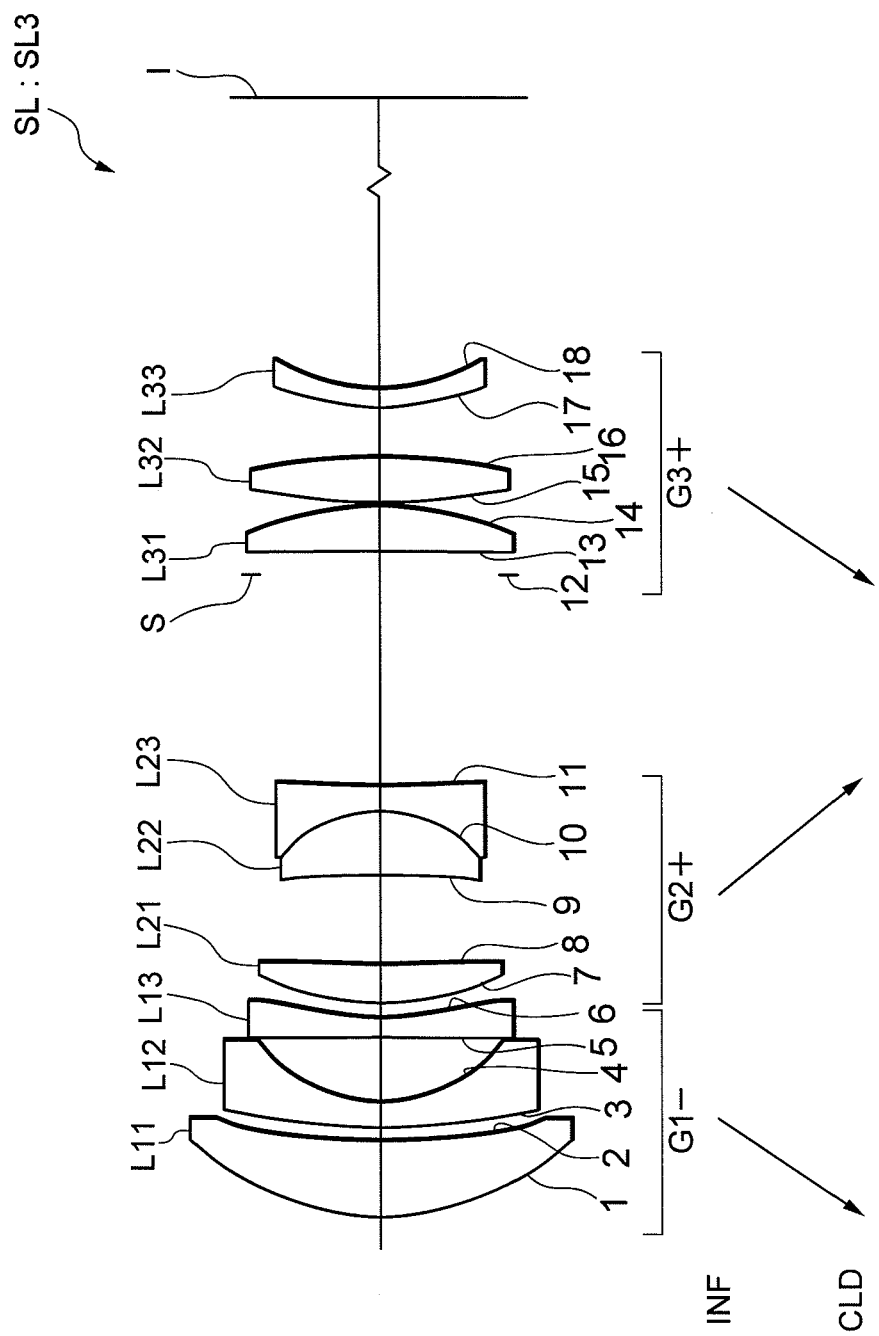

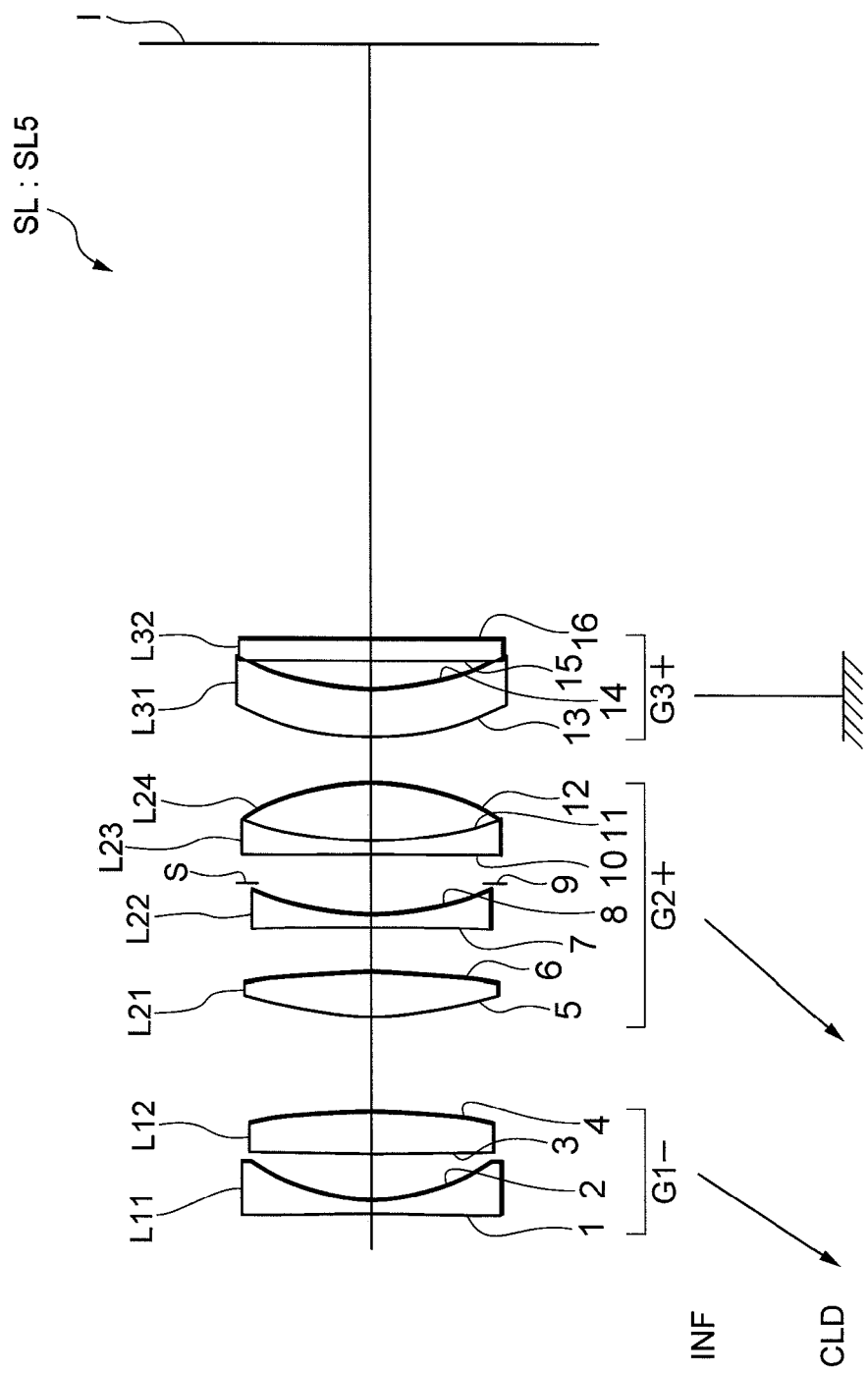

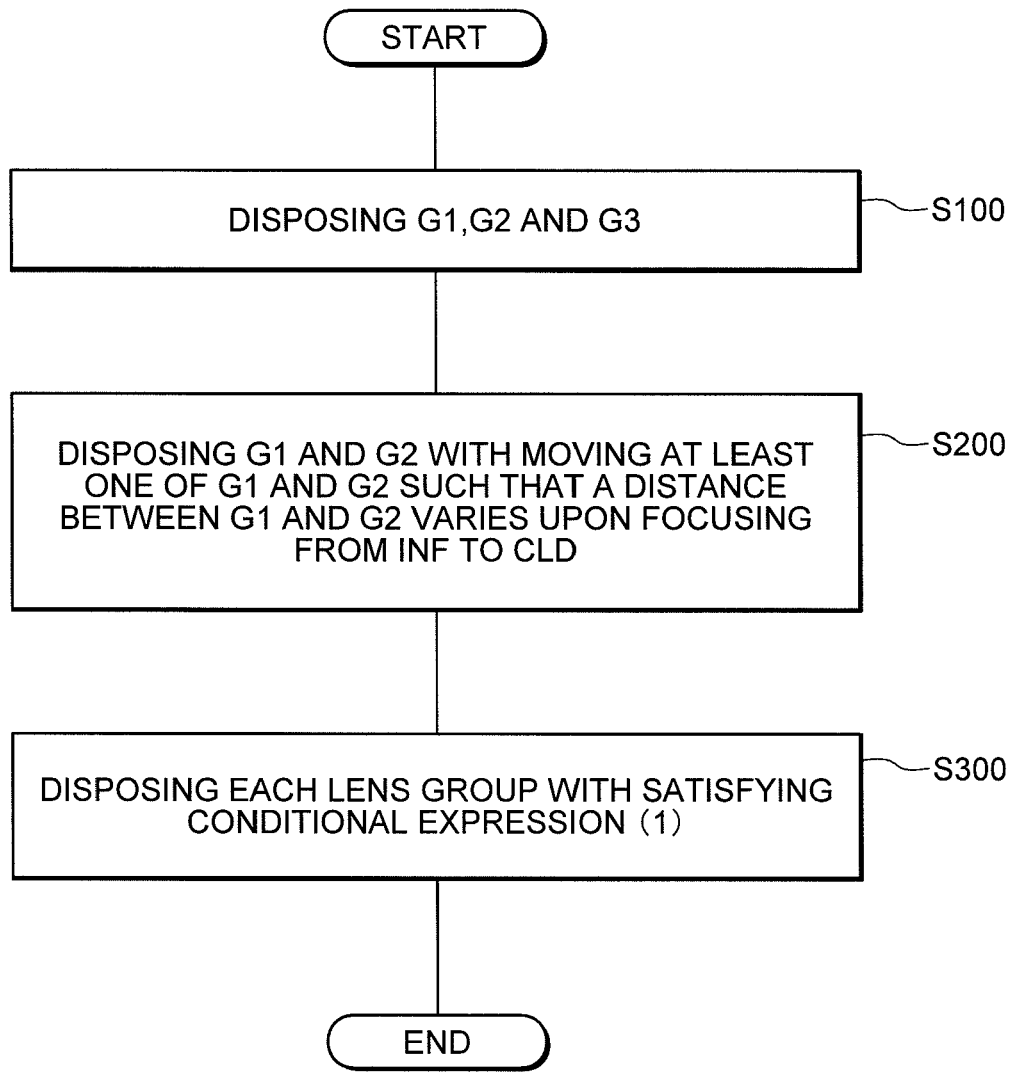

IMAGING LENS, OPTICAL APPARATUS INCLUDING IMAGING LENS AND METHOD FOR MANUFACTURING IMAGING LENS

The disclosure of the following priority application is herein incorporated by reference:

Japanese Patent Application No. 2010-042006 filed on Feb. 26, 2010.

BACKGROUND OF THE INVENTION

1. Field of the Invention

The present invention relates to an imaging lens, an optical apparatus including the imaging lens, and a method for manufacturing the imaging lens.

2. Related Background Art

A macro (micro) lens has been proposed, which is capable of focusing from an infinite-distance object point up to a photographic life-size magnification (shooting magnification=−1.0) (refer to, e.g., Japanese Patent Application Laid-Open No. 07-181390).

According to the prior art shown by Japanese Patent Application Laid-Open No. 07-181390, the imaging lens could not be used for an interchangeable lens equipped with an intra-lens-barrel motor, which is conceived as a mainstream type of lens at the present, due to a large moving amount of especially a first lens group among respective lens groups. Further, in the case of desiring a length of a lens barrel to be kept short in an infinite-distance object point focusing state and desiring a small-sized and compact lens barrel as well, a large amount of lens extension is hard to build up a structure of the lens barrel. Moreover, in the case of reducing the moving amount of particularly the first lens group while accelerating the downsizing on the extension of the prior arts, it is difficult to control fluctuations of spherical aberration and curvature of field due to focusing, and there is a room for further improvements.

SUMMARY OF THE INVENTION

It is an object of the present invention, which was made in view of these problems, to provide a downsized imaging lens of which optical performance is well corrected, an optical apparatus including the imaging lens and a method for manufacturing the imaging lens.

According to a first aspect of the present application, there is provided an imaging lens comprising, in order from an object side: a first lens group having negative refractive power; a second lens group having positive refractive power; and a third lens group having positive refractive power, upon focusing on a near-distance object point from an infinite-distance object point, at least one of said first lens group and said second lens group being moved so as to change a distance between said first lens group and said second lens group, and said imaging lens satisfying the following conditional expression (1):

$$0.2<(-f1)/f0<1.7 \tag{1}$$

where f1 denotes a focal length of said first lens group, and f0 denotes a focal length of the imaging lens in an infinite-distance focusing state.

In the first aspect of the present application, it is preferable that upon focusing on the near-distance object point from the infinite-distance object point, at least one of said first lens group and said second lens group is moved so as to expand the distance between said first lens group and said second lens group.

In the first aspect of the present application, it is preferable that upon focusing on the near-distance object point from the infinite-distance object point, at least one of said second lens group and said third lens group is moved so as to narrow a distance between said second lens group and said third lens group.

In the first aspect of the present application, it is preferable that said imaging lens satisfies the following conditional expression (2):

$$0.4<f2/f0<2.0 \tag{2}$$

where f2 denotes a focal length of said second lens group.

In the first aspect of the present application, it is preferable that said imaging lens satisfies the following conditional expression (3):

$$0.4<f3/f0<100.0 \tag{3}$$

where f3 denotes a focal length of said third lens group.

In the first aspect of the present application, it is preferable that said imaging lens satisfies the following conditional expression (4):

$$0.05<X1/f0<0.80 \tag{4}$$

where a moving amount given upon moving to the object side from the image side takes a positive value, and X1 denotes a moving amount of said first lens group from the infinite-distance focusing state up to a photographic life-size magnification (magnification=−1.0) state.

In the first aspect of the present application, it is preferable that said imaging lens satisfies the following conditional expression (5):

$$0.5<\Delta D23/f0<5.0 \tag{5}$$

where ΔD23 is a value obtained by subtracting a distance between the second lens group and the third lens group in the near-distance object point focusing state from a distance between the second lens group and the third lens group in the infinite-distance object point focusing state.

In the first aspect of the present application, it is preferable that said first lens group includes at least one positive lens and one negative lens.

In the first aspect of the present application, it is preferable that said first lens group includes at least one positive lens and two negative lenses.

In the first aspect of the present application, it is preferable that said second lens group includes at least one aspherical lens.

In the first aspect of the present application, it is preferable that said third lens group includes at least two positive lenses and one negative lens.

In the first aspect of the present application, it is preferable that said second lens group moves to the image side from the object side upon focusing on the near-distance object point.

In the first aspect of the present application, it is preferable that said second lens group is fixed with respect to the image plane upon focusing on the near-distance object point.

In the first aspect of the present application, it is preferable that said third lens group includes a negative meniscus lens having a concave surface facing an image side.

In the first aspect of the present application, it is preferable that an aperture stop is disposed between the second lens group and the third lens group.

In the first aspect of the present application, it is preferable that upon focusing on the near-distance object point from the infinite-distance object point, an aperture stop is moved in a body with the third lens group.

In the first aspect of the present application, it is preferable that an aperture stop is disposed in the second lens group.

In the first aspect of the present application, it is preferable that upon focusing on the near-distance object point from the infinite-distance object point, an aperture stop is moved in a body with the second lens group.

According to a second aspect of the present invention, there is provided an optical apparatus including said imaging lens according to the first aspect.

According to a third aspect of the present invention, there is provided a method for manufacturing an imaging lens including, in order from an object side: a first lens group having negative refractive power; a second lens group having positive refractive power; and a third lens group having positive refractive power, said method comprising steps of: disposing the first through third lens groups; disposing the first lens group and the second lens group so that upon focusing on a near-distance object point from an infinite-distance object point, at least one of the first lens group and the second lens group is moved so as to change a distance between the first lens group and the second lens group; and disposing each lens group with satisfying the following conditional expression (1):

$$0.2 < (-f1)/f0 < 1.7 \quad (1)$$

where f1 denotes a focal length of said first lens group, and f0 denotes a focal length of the imaging lens in an infinite-distance focusing state.

In the third aspect of the present invention, it is preferable that the following step is further included: moving at least one of said first lens group and said second lens group so as to expand the distance between said first lens group and said second lens group upon focusing on the near-distance object point from the infinite-distance object point.

In the third aspect of the present invention, it is preferable that the following step is further included: moving at least one of said second lens group and said third lens group so as to narrow a distance between said second lens group and said third lens group upon focusing on the near-distance object point from the infinite-distance object point.

In the third aspect of the present invention, it is preferable that the following step is further included: satisfying the following conditional expression (2):

$$0.4 < f2/f0 < 2.0 \quad (2)$$

where f2 denotes a focal length of said second lens group.

In the third aspect of the present invention, it is preferable that the following step is further included: satisfying the following conditional expression (3):

$$0.4 < f3/f0 < 100.0 \quad (3)$$

where f3 denotes a focal length of said third lens group.

In the third aspect of the present invention, it is preferable that the following step is further included: satisfying the following conditional expression (4):

$$0.05 < X1/f0 < 0.80 \quad (4)$$

where a moving amount given upon moving to the object side from the image side takes a positive value, and X1 denotes a moving amount of said first lens group from the infinite-distance focusing state up to a photographic life-size magnification (magnification=−1.0) state.

In the third aspect of the present invention, it is preferable that the following step is further included: satisfying the following conditional expression (5):

$$0.5 < \Delta D23/f0 < 5.0 \quad (5)$$

where ΔD23 is a value obtained by subtracting a distance between the second lens group and the third lens group in the near-distance object point focusing state from a distance between the second lens group and the third lens group in the infinite-distance object point focusing state.

It is feasible to provide, when configuring an imaging lens, an optical apparatus including the imaging lens and a method for manufacturing the imaging lens in the way described above, a downsized imaging lens suited to an imaging apparatus such as a single lens reflex camera, having a less of change in overall length and optimal to driving the intra-lens-barrel motor.

BRIEF DESCRIPTION OF THE DRAWINGS

FIG. 1 is a sectional view showing a configuration of an imaging lens according to Example 1.

FIGS. 2A and 2B are various aberration diagrams in Example 1; in which FIG. 2A is an aberration diagram in an infinite-distance focusing state; and FIG. 2B is a diagram of a variety of aberrations in a photographic life-size magnification (shooting magnification=−1.0) state.

FIGS. 4A and 4B are various aberration diagrams in Example 2; in which FIG. 4A is an aberration diagram in the infinite-distance focusing state; and FIG. 4B is a diagram of various aberrations in the photographic life-size magnification (shooting magnification=−1.0) state.

FIG. 5 is a sectional view showing a configuration of an imaging lens according to Example 3.

FIGS. 6A and 6B are various aberration diagrams in Example 3; in which FIG. 6A is an aberration diagram in the infinite-distance focusing state; and FIG. 6B is a diagram of various aberrations in the photographic life-size magnification (shooting magnification=−1.0) state.

FIGS. 8A and 8B are various aberration diagrams in Example 4; in which FIG. 8A is an aberration diagram in the infinite-distance focusing state; and FIG. 8B is a diagram of various aberrations in the photographic life-size magnification (shooting magnification=−1.0) state.

FIG. 9 is a sectional view showing a configuration of an imaging lens according to Example 5.

FIGS. 10A and 10B are various aberration diagrams in Example 5; in which FIG. 10A is an aberration diagram in the infinite-distance focusing state; and FIG. 10B is a diagram of various aberrations in the photographic life-size magnification (shooting magnification=−1.0) state.

FIG. 12 is an explanatory flowchart of a method for manufacturing an imaging lens according to the present embodiment.

DESCRIPTION OF THE MOST PREFERRED EMBODIMENT

Figure 2A:
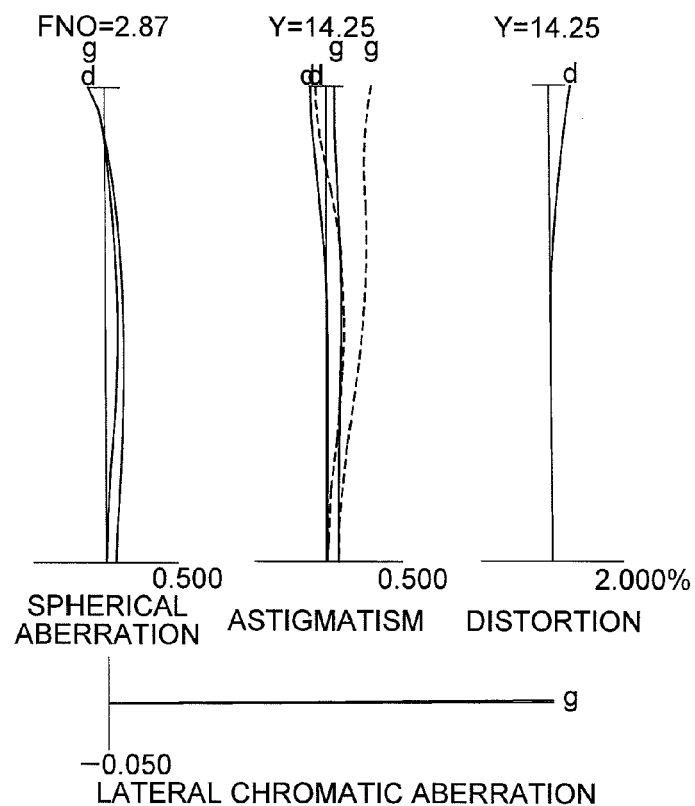

A preferred embodiment of the present invention will hereinafter be described with reference to accompanying drawings. As shown in FIG. 1, an imaging lens SL is composed of, in order from an object side, a first lens group G1 having negative refractive power, a second lens group G2 having positive refractive power, and a third lens group G3 having positive refractive power. Then, upon focusing on a near-distance object point from an infinite-distance object point, at least one of the first lens group G1 and the second lens group G2 is moved so that a distance between the first lens group G1 and the second lens group G2 changes.

Further, in this imaging lens SL, it is desirable that upon focusing on a near-distance object point from an infinite-distance object point, at least one of the first lens group G1 and the second lens group G2 is moved so that the distance between the first lens group G1 and the second lens group G2 changes while expanding. This configuration enables a moving amount to be reduced when at least one of the first lens group G1 and the second lens group G2 is moved.

Moreover, in this imaging lens SL, it is desirable that upon focusing on a near-distance object point from an infinite-distance object point, at least one of the second lens group G2 and the third lens group G3 is moved so that the distance between the second lens group G2 and the third lens group G3 changes while narrowing. This configuration enables the moving amount to be reduced when at least one of the second lens group G2 and the third lens group G3 is moved.

Generally, a mainstream of an imaging lens (macro lens) is a positive leading type lens. As a result of aiming at a downsized optical system which maintains a sufficient angle of view and a sufficient back focal length and satisfies optical performance, however, a novel negative leading type macro lens could be proposed. In particular, the imaging lens SL according to the present embodiment is characterized in that the first lens group G1 is constructed to have comparatively strong refractive power. An effect thereof lies in reducing the moving amount for focusing of the first lens group G1 and keeping preferable optical performance.

A condition for configuring this type of imaging lens SL will be discussed. An imaging lens SL according to the present embodiment, it is desirable, satisfies the following conditional expression (1):

$$0.2 < (-f1)/f0 < 1.7 \tag{1}$$

where f1 is a focal length of the first lens group G1, and f0 is a focal length of the whole system in an infinite-distance focusing state.

Conditional expression (1) is a condition which specifies a proper focal length, i.e., the proper refractive power of the first lens group G1 having negative refractive power. When the ratio (−f1)/f0 is equal to or exceeds the upper limit of conditional expression (1), refractive power of the first lens group G1 having negative refractive power weakens, and hence there increases an amount of lens extension upon focusing up to a life-size magnification of the photography, resulting in a disadvantage for driving an intra-lens-barrel motor and in disability to configure an imaging lens SL. Further, when refractive power of other lens groups is intensified to decrease the moving amount, especially spherical aberration worsens, which is an undesirable aspect. It is preferable in order to ensure the effects of the present embodiment that the upper limit of conditional expression (1) is set to 1.6, which enables the aberration to be corrected satisfactorily. Moreover, it is further preferable in order to ensure the effects of the present embodiment that the upper limit of conditional expression (1) is set to 1.5. Furthermore, it is further preferable in order to ensure the effects of the present embodiment that the upper limit of conditional expression (1) is set to 1.4, whereby the effects of the present embodiment can be exhibited at the maximum. It is yet further preferable in order to ensure the effects of the present embodiment that the upper limit of conditional expression (1) is set to 1.3 or 1.2. On the other hand, when the ratio (−f1)/f0 is equal to or falls below the lower limit of conditional expression (1), refractive power of the first lens group G1 having negative refractive power is intensified, and therefore the aberration caused upon focusing increasingly fluctuates, particularly, curvature of field and astigmatism increasingly fluctuate, which is an undesirable aspect. Moreover, distortion increases undesirably. It is preferable in order to further ensure the effects of the present embodiment that the lower limit of conditional expression (1) is set to 0.3, which enables the aberration to be corrected satisfactorily. Furthermore, it is further preferable in order to ensure the effects of the present embodiment that the lower limit of conditional expression (1) is set to 0.4. It is preferable in order to still further ensure the effects of the present embodiment that the lower limit of conditional expression (1) is set to 0.5, whereby the effects of the present embodiment can be exhibited at the maximum.

Moreover, it is desirable that an imaging lens SL according to the present embodiment satisfies the following conditional expression (2):

$$0.40 < f2/f0 < 2.00 \tag{2}$$

where f2 is a focal length of the second lens group, and f0 is a focal length of the whole system in the infinite-distance focusing state.

Conditional expression (2) is a conditional expression which specifies a proper focal length of the second lens group G2 having positive refractive power, i.e., specifies the proper refractive power thereof. When the ratio f2/f0 is equal to or exceeds the upper limit of conditional expression (2), refractive power of the second lens group G2 having positive refractive power weakens, and hence, when the second lens group G2 is a movable lens group, there rises the amount of lens extension when focusing up to the life-size magnification of the photography, resulting in the disadvantage for driving the intra-lens-barrel motor and in disability to configure an imaging lens SL. Moreover, when refractive power of other lens groups is intensified to decrease the moving amount, fluctuation in aberration upon focusing, especially curvature of field and astigmatism get worsened, which is an undesirable aspect. It is preferable in order to ensure the effects of the present embodiment that the upper limit of conditional expression (2) is set to 1.50, which is more advantageous for correcting various aberrations described above. Moreover, it is also preferable in order to further ensure the effects of the present embodiment that the upper limit of conditional expression (2) is set to 1.25. Furthermore, it is also preferable in order to still further ensure the effects of the present embodiment that the upper limit of conditional expression (2) is set to 1.24, whereby the effects of the present embodiment can be exhibited at the maximum. On the other hand, when the ratio f2/f0 is equal to or falls below the lower limit of conditional expression (2), refractive power of the second lens group G2 having positive refractive power is intensified, and therefore the aberration caused upon focusing increasingly fluctuates, particularly, spherical aberration increasingly fluctuates, which is an undesirable aspect. It is preferable in order to ensure the effects of the present embodiment that the lower limit of conditional expression (2) is set to 0.50, which is advantageous for correcting variety of aberrations. Moreover, it is preferable in order to further ensure the effects of the present embodiment that the lower limit of conditional expression (2) is set to 0.60. Furthermore, it is preferable in order to still further ensure the effects of the present embodiment that the lower limit of conditional expression (2) is set to 0.72, whereby the effects of the present embodiment can be exhibited at the maximum. Additionally, it is preferable in order to yet further ensure the effects of the present embodiment that the lower limit of conditional expression (2) is set to 0.75 or 0.89.

Further, an imaging lens SL according to the present embodiment satisfies, it is desirable, the following conditional expression (3):

$$0.4 < f3/f0 < 100.0 \tag{3}$$

where f3 is a focal length of the third lens group G3, and f0 is a focal length of the whole system in the infinite-distance focusing state.

Conditional expression (3) is a condition which specifies an appropriate focal length of the third lens group G3 having positive refractive power, i.e., specifies appropriate refractive power thereof. When the ratio f3/f0 is equal to or exceeds the upper limit of conditional expression (3), refractive power of the third lens group G3 having positive refractive power weakens, and hence the amount of lens extension of each lens group increases as well as a rise in overall length, resulting in the disadvantage for driving the intra-lens-barrel motor and in the disability to configure an imaging lens SL, which is an undesirable aspect. Moreover, the distance between the second lens group G2 and the third lens group G3 decreases, and resultantly the lens incurs upsizing, which is also an undesirable aspect. Moreover, if the moving amount of each lens group is forcibly restrained, fluctuation in aberration upon focusing, especially curvature of field and astigmatism get worsened, which is undesirable aspect. Herein, it is preferable in order to ensure the effects of the present embodiment that the upper limit of conditional expression (3) is set to 98.0, thereby obtaining more preferable results with respect to curvature of field and astigmatism. Furthermore, it is preferable in order to ensure the effects of the present embodiment that the upper limit of conditional expression (3) is set to 95.0. Additionally, it is preferable in order to ensure the effects of the present embodiment that the upper limit of conditional expression (3) is set to 93.0, whereby the effects of the present embodiment can be exhibited at the maximum. Furthermore, it is preferable in order to ensure the effects of the present embodiment that the upper limit of conditional expression (3) is set to 2.0. Moreover, it is preferable in order to further ensure the effects of the present embodiment that the upper limit of conditional expression (3) is set to 1.8 or 1.5 or 1.3. On the other hand, when the ratio f3/f0 is equal to or falls below the lower limit of conditional expression (3), refractive power of the third lens group G3 having positive refractive power is intensified, resulting in a decrease in back focal length, a closer exit pupil and getting unsuitable for an optical system of an auto focus camera. Further, fluctuation in aberration upon focusing, especially curvature of field and astigmatism get worsened, which is an undesirable aspect. It is preferable in order to ensure the effects of the present embodiment that the lower limit of conditional expression (3) is set to 0.5, whereby various aberrations are corrected more satisfactorily. Moreover, it is preferable in order to further ensure the effects of the present embodiment that the lower limit of conditional expression (3) is set to 0.6. Furthermore, it is preferable in order to still further ensure the effects of the present embodiment that the lower limit of conditional expression (3) is set to 0.7, whereby the effects of the present embodiment can be exhibited at the maximum.

Further, it is desirable that an imaging lens SL according to the present embodiment satisfies the following conditional expression (4):

$$0.05 < X1/f0 < 0.80 \tag{4}$$

where X1 is a moving amount of the first lens group G1 from an infinite-distance focusing state up to a photographic life-size magnification (shooting magnification=−1.0) state as a positive value of the moving amount in the case of the movement to the object side from the image side, and f0 is the focal length of the whole system in the infinite-distance focusing state.

Conditional expression (4) is a condition which specifies an optimum moving amount of the first lens group G1 having negative refractive power. When the ratio X1/f0 is equal to or exceeds the upper limit of conditional expression (4), the moving amount of the first lens group G1 having negative refractive power remarkably rises, and the amount of lens extension upon focusing up to the life-size magnification of the photography increases, resulting in the disadvantage for driving the intra-lens-barrel motor and the disability to configure an imaging lens SL. Moreover, distortion fluctuates increasingly, which is an undesirable aspect. It is preferable in order to ensure the effects of the present embodiment that the upper limit of conditional expression (4) is set to 0.65, which leads to advantages for downsizing and for correcting various aberrations. Furthermore, it is preferable in order to further ensure the effects of the present embodiment that the upper limit of conditional expression (4) is set to 0.50. Moreover, it is preferable in order to further ensure the effects of the present embodiment that the upper limit of conditional expression (4) is set to 0.42, whereby the effects of the present embodiment can be exhibited at the maximum. On the other hand, when the ratio X1/f0 is equal to or falls below the lower limit of conditional expression (4), the moving amount of the first lens group G1 having negative refractive power remarkably decreases, and, in the case of ensuring the same magnification, each lens group needs constructing with strong power, resulting in deterioration of spherical aberration and the rise in fluctuation of curvature of field, which is an undesirable aspect. Additionally, it is preferable in order to ensure the effects of the present embodiment that the lower limit of conditional expression (4) is set to 0.10, whereby various aberrations are corrected more satisfactorily. Moreover, it is preferable in order to further ensure the effects of the present embodiment that the lower limit of conditional expression (4) is set to 0.15. Furthermore, it is preferable in order to still further ensure the effects of the present embodiment that the lower limit of conditional expression (4) is set to 0.20, whereby the effects of the present embodiment can be exhibited at the maximum.

Further, an imaging lens SL according to the present embodiment satisfies, it is desirable, the following conditional expression (5):

$$0.5 < \Delta D23/f0 < 5.0 \tag{5}$$

where ΔD23 is a value obtained by subtracting a distance between the second lens group G2 and the third lens group G3 in a near-distance object point focusing state from the distance between the second lens group G2 and the third lens group G3 in an infinite-distance object point focusing state.

Conditional expression (5) is a condition which specifies an optimum value of a variation quantity of the distance between the second lens group G2 and the third lens group G3 upon focusing. When the ratio ΔD23/f0 is equal to or exceeds the upper limit of conditional expression (5), this implies that variation in the distance between the second lens group G2 and the third lens group G3 upon focusing increases. In this case, a change in overall length rises, and the lens incurs upsizing, resulting in, by extension, the disadvantage for driving the intra-lens-barrel motor and the disability to configure an imaging lens SL. Furthermore, in the case of intensifying refractive power by restraining the motion of each lens for forcibly downsizing the lens, fluctuations of curvature of field and astigmatism worsen, which is an undesirable aspect. It is preferable in order to ensure the effects of the present embodiment that the upper limit of conditional expression (5) is set to 4.0, whereby various aberrations are corrected more satisfactorily. Moreover, it is preferable in order to further ensure the effects of the present embodiment that the upper limit of conditional expression (5) is set to 3.5. Furthermore, it is preferable in order to further ensure the effects of the present embodiment that the upper limit of conditional expression (5) is set to 3.0, whereby the effects of the present embodiment can be exhibited at the maximum. On the other hand, when the ratio $\Delta D23/f0$ is equal to or falls below the lower limit of conditional expression (5), this implies that there decreases a variation in the distance between the second lens group G2 and the third lens group G3 upon focusing. In this case, if scheming to acquire a sufficient variation of the magnification, it is necessary to intensify refractive power of the second lens group G2 and refractive power of the third lens group G3, with the result that spherical aberration gets worsened and curvature of field incurs increasing fluctuation, which is an undesirable aspect. Herein, it is preferable in order to ensure the effects of the present embodiment that the lower limit of conditional expression (5) is set to 1.0, whereby various aberrations are corrected more satisfactorily. Moreover, it is preferable in order to further ensure the effects of the present embodiment that the lower limit of conditional expression (5) is set to 1.5. Furthermore, it is preferable in order to still further ensure the effects of the present embodiment that the lower limit of conditional expression (5) is set to 1.2, whereby the effects of the present embodiment can be exhibited at the maximum.

Further, in an imaging lens SL according to the present embodiment, it is desirable that the first lens group G1 includes at least one positive lens and one negative lens, thereby enabling chromatic aberration and distortion to be well corrected. Alternatively, the first lens group G1 may include at least one positive lens and two negative lenses, thereby enabling also chromatic aberration and distortion to be well corrected.

Moreover, in an imaging lens SL according to the present embodiment, it is desirable that the second lens group G2 includes at least one aspherical lens, whereby spherical aberration can be well corrected. Alternatively, it is desirable that the first lens group G1 includes at least one aspherical lens, whereby distortion and curvature of field can be well corrected.

Further, in an imaging lens SL, it is desirable that the third lens group G3 includes at least two positive lenses and one negative lens, thereby enabling spherical aberration to be well corrected.

Moreover, in an imaging lens SL according to the present embodiment, it is desirable that the second lens group G2 is moved to the image side from the object side upon focusing on a near-distance object point, which is effective in restraining fluctuation of curvature of field. Alternatively, the second lens group G2 may be fixed on the image side upon focusing of a near-distance object point, thereby reducing the number of moving lens groups, simplifying a structure of the lens barrel in design and enabling a load on the motor for the focusing drive to be decreased.

Figure 11:
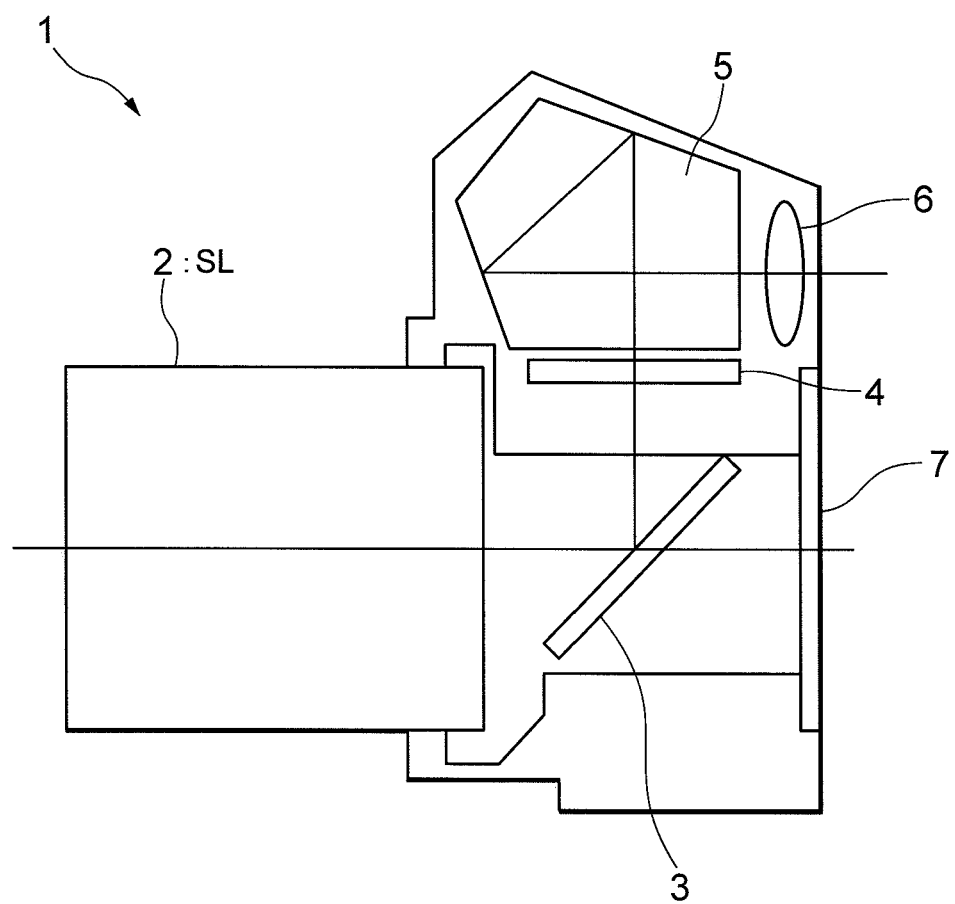
FIG. 11 is a sectional view of a digital single lens reflex camera mounted with the imaging lens according to the present embodiment.

FIG. 11 shows a schematic sectional view of a single lens reflex digital camera 1 (which will hereinafter simply be termed a camera) by way of an optical apparatus including the imaging lens SL described above. In the camera 1, light beams from an unillustrated object (an object to be imaged) are converged by an imaging lens 2 (the imaging lens SL), and an image of the light beams is formed on a focusing screen 4 via a quick return mirror 3. Then, the light beams, of which the image is formed on the focusing screen 4, are reflected plural times within a pentagonal roof prism 5 and led to an eyepiece 6. A photographer is thereby capable of observing the object (the object to be imaged) as an erected image via the eyepiece 6.

Moreover, when the photographer presses an unillustrated release button, the quick return mirror 3 retreats outside of the optical path, and the light beams from the unillustrated object (the object to be imaged), which are converged by the imaging lens 2, form an object image on an imaging device 7. The image formed by the light beams from the object (the object to be imaged) is thereby captured by the imaging device 7 and stored as the image of the object (the object to be imaged) in an unillustrated memory. Thus, the photographer can photograph the object (the object to be imaged) by use of the camera 1. Note that the camera 1 illustrated in FIG. 11 may be constructed to retain the imaging lens SL in an attachable/detachable manner and may also be constructed integrally with the imaging lens SL. Moreover, the camera 1 may be constructed as a so-called called single lens reflex camera and may also be constructed as a compact camera including none of the quick return mirror.

Contents of the following description can be properly adopted within a range that does not deteriorate optical performance.

In the discussion made above and the embodiment, which will hereinafter be described, although a 3-group configuration has been exemplified, other group configurations such as a 4-group configuration can be applied. Further, any inconvenience may not be caused by taking a configuration of adding a lens or a lens group on the object side and a configuration of adding a lens or a lens group on the side closest to the image. Incidentally, a lens group represents a portion having at least one lens, which is separated by air distances that change upon focusing.

A vibration reduction lens group which corrects an image vibration caused by a hand vibration (camera shake) may also be constructed in a way that moves a lens group or a segmental lens group so as to include an element in a direction perpendicular to the optical axis or rotationally moves (sways) a lens group or a segmental lens group in an intra-plane direction containing the optical axis. In particular, it is preferable that at least a part of the second lens group G2 or the third lens group G3 is constructed as the vibration reduction lens group.

A lens surface of a lens composing an imaging lens according to the present application may be a spherical surface, a plane surface, or an aspherical surface. When a lens surface is a spherical surface or a plane surface, lens processing, assembling and adjustment become easy, and deterioration in optical performance caused by lens processing error, and assembling and adjustment errors can be prevented, so that it is preferable. Moreover, even if the surface is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

An aperture stop S is preferably disposed within the second lens group G2 or within the third lens group G3 or in the vicinity thereof, however, an available configuration is that a lens frame substitutes for a role of the aperture stop without providing a member as the aperture stop.

Further, each lens surface may be coated with an antireflection film having a high transmittance over a broad wave range in order to reduce a flare and ghost and to attain high optical performance with a high contrast.

It should be noted that the present embodiment has been discussed in a way that adds the constructive requirements for providing an easy-to-understand description of the present invention, however, as a matter of course, the present invention is not limited to this descriptive mode.

An outline of a method for manufacturing an imaging lens SL according to the present embodiment will hereinafter be described with reference to FIG. 12. To start with, the lens groups are prepared by disposing the respective lenses (step S100). To be specific, in the present embodiment, e.g., a first lens group G1 is composed of disposing, in order from an object side, a positive meniscus lens L11 with a convex surface directed to the object side, a negative meniscus lens L12 with a convex surface directed to the object side and a biconcave lens L13 having an aspherical surface on the image side, the second lens group G2 is composed of disposing, in order from the object side, a positive meniscus lens L21 with a convex surface directed to the object side and a cemented positive lens constructed by a positive meniscus lens L22 having an aspherical surface on the object side cemented with a biconcave lens L23, and a third lens group G3 is composed of disposing an aperture stop S, a positive meniscus lens L31 with a convex surface directed to the image side, a biconvex lens L32, a negative meniscus lens L33 with a convex surface directed to the object side and a positive meniscus lens L34 with a convex surface directed to the image side. The imaging lens SL is manufactured by disposing the thus-prepared lens groups.

At this time, upon focusing on a near-distance object point from an infinite-distance object point, the first lens group G1 and the second lens group G2 are disposed in a way that moves at least one of the first and second lens groups so as to change a distance between the first lens group G1 and the second lens group G2 (step S200). Further, the respective lens groups are disposed to satisfy conditional expression (1) described above, where f1 is the focal length of the first lens group G1, and f0 is the focal length of the whole system in the infinite-distance focusing state (step S300).

Each of Examples according to the present embodiment will hereinafter be described with reference to the accompanying drawings. Note that FIGS. 1, 3, 5, 7 and 9 illustrate how refractive power of imaging lenses SL1 through SL5 is distributed and how the respective lens groups are moved upon focusing on a near-distance object point (CLD) from an infinite-distance object point (INF). As illustrated in these drawings, each of the imaging lenses SL1 through SL5 in each Example is composed of, in order from an object side, a first lens group G1 having negative refractive power, a second lens group G2 having positive refractive power and a third lens group G3 having positive refractive power.

In each of Examples, an aspherical surface is expressed by the following expression (a) when y is a height in the direction vertical to the optical axis, S(y) is a distance (sag amount) along the optical axis from a tangent plane of a vertex of each aspherical surface at the height y up to each aspherical surface, r is a radius of curvature (paraxial radius of curvature) of the reference sphere, κ is a conical coefficient and An is an n-th order aspherical surface coefficient. Note that [E-n] represents [×10$^{-n}$] in the subsequent working examples.

$$S(y)=(y^2/r)/\{1+(1-\kappa\times y^2/r^2)^{1/2}\}+A4\times y^4+A6\times y^6+A8\times y^8+A10\times\times y^{10} \quad\quad (a)$$

It should be noted that a secondary aspherical surface coefficient A2 is "0" in each Example. Further, the aspherical surface is attached with a mark "*" on the left side of a surface number in the Table of each Example.

EXAMPLE 1

FIG. 1 is a view showing a configuration of an imaging lens SL1 according to Example 1. In the imaging lens SL1 in FIG. 1, a first lens group G1 is composed of, in order from an object side, a positive meniscus lens L11 with a convex surface directed to the object side, a negative meniscus lens L12 with a convex surface directed to the object side and a biconcave lens L13 having an aspherical surface on the image side. Further, a second lens group G2 is composed of, in order from the object side, a positive meniscus lens L21 with a convex surface directed to the object side and a cemented positive lens constructed by a positive meniscus lens L22 having an aspherical surface on the object side cemented with a biconcave lens L23. Moreover, a third lens group G3 is composed of, in order from the object side, an aperture stop S, a positive meniscus lens L31 with a convex surface directed to the image side, a biconvex lens L32, a negative meniscus lens L33 with a convex surface directed to the object side and a positive meniscus lens L34 with a convex surface directed to the image side.

The following Table 1 shows various values of data of the imaging lens SL1 according to Example 1. In (Specifications), f denotes a focal length, FNO denotes an f-number, ω denotes a half angle of view (unit: degree), Y denotes an image height, TL denotes a total lens length, and Bf denotes a back focal length, respectively. In (Lens Data), the left most column "i" shows the lens surface number counted in order from the object side, the second column "r" shows a radius of curvature of the lens surface, the third column "d" shows a distance to the next optical surface, the fourth column "vd" shows an Abbe number at d-line (wavelength λ=587.6 nm), and the fifth column "nd" shows refractive index at d-line (wavelength λ=587.6 nm). The total lens length TL represents an on-axis distance from a first surface of the imaging lens to an image plane I in an infinite-distance object point focusing state (INF). In (Variable Distances), β, variable distances, and Bf with respect to shooting distance d0 of infinity (INF), an intermediate shooting distance (MID) (β=−0.5), and a closest shooting distance (CLD) ((β=−1.0) are shown. In (Lens Group Data), a start surface number I, a focal length with respect to each lens group are shown. Herein, the focal length, the radius of curvature, the surface distance and other items of data described in the following various items of whole data involve using generally (mm) as a unit of the length, however, an optical system acquires the equal optical performance even when proportionally enlarged or reduced and is not therefore limited to this unit. Incidentally, "r=0.0000" indicates a plane surface, and the refractive index of the air "nd=1.00000" is omitted. Further, the descriptions of the reference numerals and symbols and the various items of data are the same in the subsequent Examples.

TABLE 1

(Specifications)

f = 40.00
FNO = 2.88
ω = 19.50°

TABLE 1-continued

Y = 14.25
TL = 110.96633
Bf = 39.000

(Lens Data)

| i | r | d | νd | nd |
|---|---|---|---|---|
| 1 | 24.6812 | 6.0000 | 28.69 | 1.795040 |
| 2 | 50.7289 | 1.0000 | | |
| 3 | 52.2884 | 2.0000 | 44.78 | 1.743997 |
| 4 | 13.4073 | 5.0000 | | |
| 5 | −2376.0313 | 1.5000 | 60.29 | 1.620411 |
| *6 | 34.7824 | (d6) | | |
| 7 | 28.2031 | 3.0000 | 58.22 | 1.622990 |
| 8 | 307.4304 | 5.9024 | | |
| *9 | −149.4637 | 5.0000 | 49.61 | 1.772500 |
| 10 | −12.4323 | 2.0000 | 35.91 | 1.664460 |
| 11 | 224.4871 | (d11) | | |
| 12 | 0.0000 | 2.0000 | Aperture Stop S | |
| 13 | −54.2954 | 3.0000 | 64.12 | 1.516800 |
| 14 | −26.6795 | 0.2717 | | |
| 15 | 89.5597 | 4.0000 | 82.56 | 1.497820 |
| 16 | −36.6907 | 9.1262 | | |
| 17 | 32.7548 | 1.5000 | 31.59 | 1.756920 |
| 18 | 22.7451 | 2.5000 | | |
| 19 | −253.5488 | 3.5000 | 70.45 | 1.487490 |
| 20 | −51.9404 | (Bf) | | |

(Aspherical Surface Data)

Surface Number = 6

κ = 3.6658
A4 = −3.28165E−05
A6 = −1.03604E−07
A8 = 6.06737E−10
A10 = −5.08467E−12

Surface Number = 9

κ = 122.7220
A4 = −3.31295E−05
A6 = 7.94669E−08
A8 = −2.33348E−09
A10 = 1.71099E−11

(Lens Group Data)

| Group | I | Focal Length |
|---|---|---|
| 1 | 1 | −30.50978 |
| 2 | 7 | 48.91608 |
| 3 | 12 | 36.70758 |

(Variable Distances)

| | INF | MID | CLD |
|---|---|---|---|
| β = | 0 | −0.5 | −1.0 |
| d0 = | ∞ | 47.6489 | 5.9451 |
| d6 = | 1.00000 | 9.04786 | 16.11885 |
| d11 = | 13.66598 | 8.22807 | 4.50274 |
| Bf = | 39.00005 | 44.43796 | 48.16329 |

(Values for Conditional Expressions)

(1)(−f1)/f0 = 0.763
(2)f2/f0 = 1.223
(3)f3/f0 = 0.918
(4)X1/f0 = 0.378
(5)ΔD23/f0 = 0.229

Figure 2B:
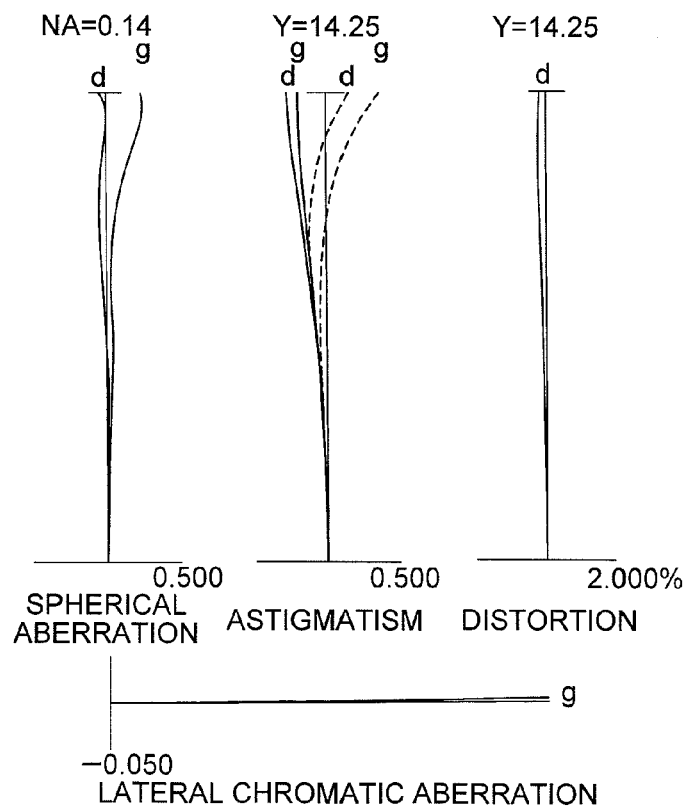

FIGS. 2A and 2B are various aberration diagrams in Example 1, in which FIG. 2A is an aberration diagram in an infinite-distance focusing state, and FIG. 2B is a diagram of a variety of aberrations in a photographic life-size magnification (shooting magnification=−1.0) state.

In respective aberration diagrams, FNO represents an f-number, Y represents an image height, d represents an aberration curve with respect to d-line ($\lambda$=587.6 nm), and g represents an aberration curve with respect to the g-line ($\lambda$=435.8 nm). Further, in the aberration diagram showing astigmatism, a solid line indicates a sagittal image plane, and a broken line indicates a meridional image plane. Note that the descriptions of these aberration diagrams are the same in the subsequent Examples as well.

As is obvious from these aberration diagrams according to Example 1, it is understood that the various aberrations such as spherical aberration, curvature of field, astigmatism and distortion are well corrected.

EXAMPLE 2

Figure 3:
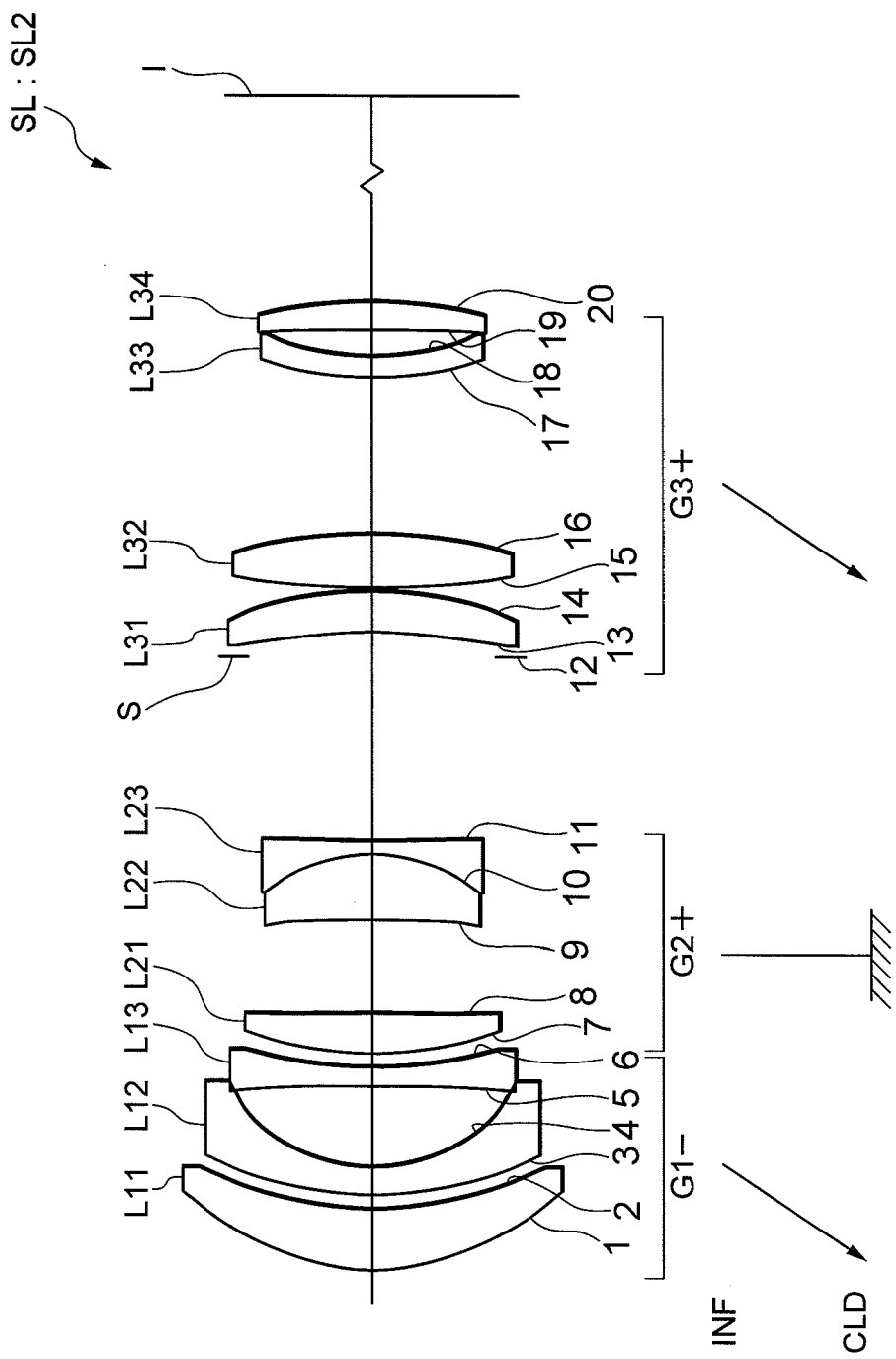
FIG. 3 is a sectional view showing a configuration of an imaging lens according to Example 2.

FIG. 3 is a view showing a configuration of an imaging lens SL2 according to Example 2. In the imaging lens SL2 shown in FIG. 3, a first lens group G1 is composed of, in order from an object side, a positive meniscus lens L11 with a convex surface directed to the object side, a negative meniscus lens L12 with a convex surface directed to the object side and a biconcave lens L13 having an aspherical surface on the image side. Further, a second lens group G2 is composed of, in order from the object side, a biconvex lens L21 and a cemented negative lens constructed by a positive meniscus lens L22 having an aspherical surface on the object side cemented with a biconcave lens L23. Moreover, a third lens group G3 is composed of, in order from the object side, an aperture stop S, a positive meniscus lens L31 with a convex surface directed to the image side, a biconvex lens L32, a negative meniscus lens L33 with a convex surface directed to the object side and a positive meniscus lens L34 with a convex surface directed to the image side.

The following table 2 shows various values of data according to Example 2.

TABLE 2

(Specifications)

f = 40.00
FNO = 2.88
ω = 19.49°
Y = 14.25
TL = 110.9629
Bf = 39.000

(Lens Data)

| i | r | d | νd | nd |
|---|---|---|---|---|
| 1 | 21.8201 | 4.5000 | 28.69 | 1.795040 |
| 2 | 33.9496 | 1.0000 | | |
| 3 | 30.3963 | 2.0000 | 44.78 | 1.743997 |
| 4 | 13.0095 | 6.0000 | | |
| 5 | −134.2675 | 1.5000 | 60.29 | 1.620411 |
| *6 | 34.2828 | (d6) | | |
| 7 | 30.0455 | 3.0000 | 58.22 | 1.622990 |
| 8 | −831.3457 | 6.7884 | | |
| *9 | −103.8283 | 5.0000 | 49.61 | 1.772500 |
| 10 | −12.4216 | 1.0000 | 35.91 | 1.664460 |
| 11 | 290.6485 | (d11) | | |
| 12 | 0.0000 | 2.0000 | Aperture Stop S | |
| 13 | −48.4187 | 3.0000 | 64.12 | 1.516800 |
| 14 | −27.6028 | 0.2717 | | |
| 15 | 77.0555 | 4.0000 | 82.56 | 1.497820 |
| 16 | −38.4386 | 11.7370 | | |
| 17 | 32.4189 | 1.5000 | 31.59 | 1.756920 |

TABLE 2-continued

| 18 | 22.4877 | 2.0000 | | |
| 19 | −119.4108 | 2.0000 | 70.45 | 1.487490 |
| 20 | −36.8363 | (Bf) | | |

(Aspherical Surface Data)

Surface Number = 6

κ = 5.4028
A4 = −3.54778E−05
A6 = −1.19811E−07
A8 = 6.25359E−10
A10 = −5.81834E−12

Surface Number = 9

κ = 62.7848
A4 = −2.80900E−05
A6 = 7.02810E−08
A8 = −1.61839E−09
A10 = 1.05385E−11

(Lens Group Data)

| Group | I | Focal Length |
|---|---|---|
| 1 | 1 | −30.46004 |
| 2 | 7 | 49.09581 |
| 3 | 12 | 36.92368 |

(Variable Distances)

| | INF | MID | CLD |
|---|---|---|---|
| β = | 0 | −0.5 | −1.0 |
| d0 = | ∞ | 47.5259 | 5.8590 |
| d6 = | 1.00000 | 9.05875 | 16.14621 |
| d11 = | 13.66598 | 8.22089 | 4.48480 |
| Bf = | 38.99972 | 44.44481 | 48.18090 |

(Values for Conditional Expressions)

(1)(−f1)/f0 = 0.762
(2)f2/f0 = 1.227
(3)f3/f0 = 0.923
(4)X1/f0 = 0.379
(5)ΔD23/f0 = 0.230

Figure 4A:
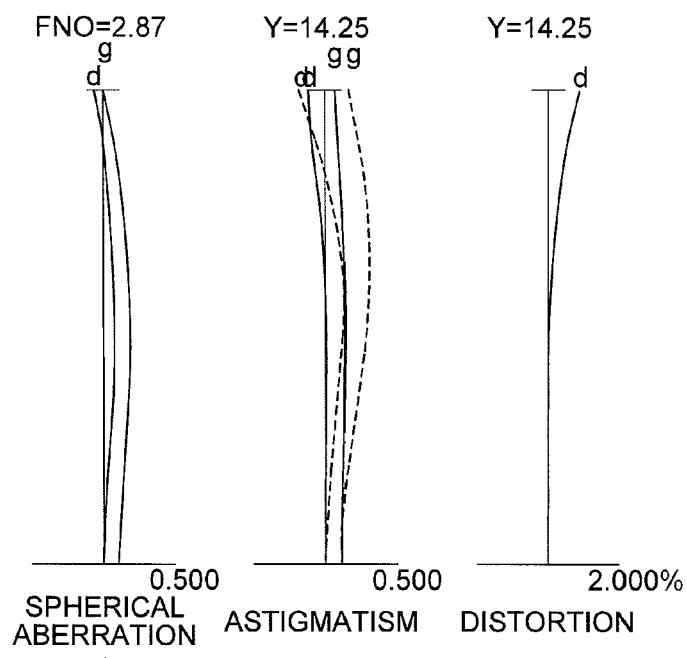
Figure 4B:
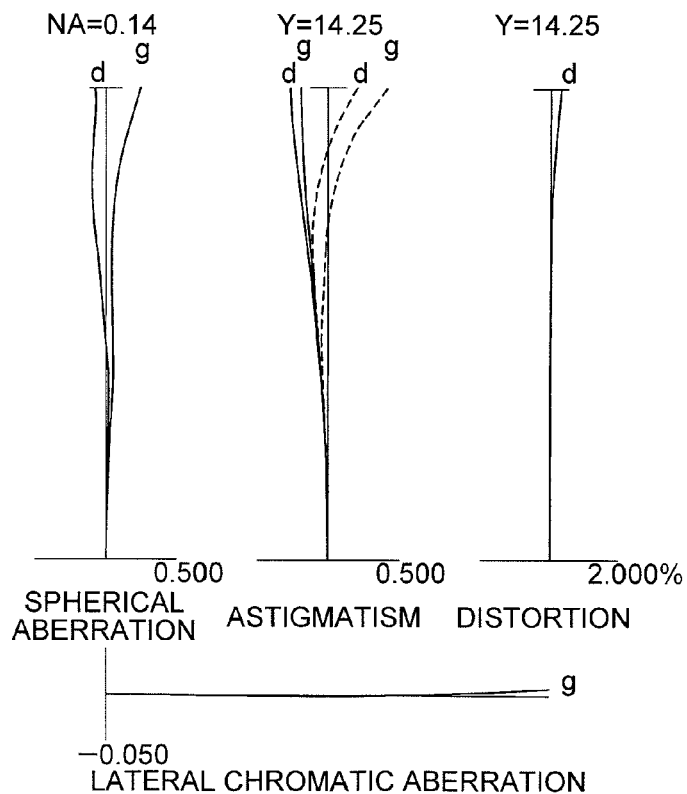

FIGS. 4A and 4B are various aberration diagrams in Example 2, in which FIG. 4A is an aberration diagram in the infinite-distance focusing state, and FIG. 4B is a diagram of various aberrations in the photographic life-size magnification (shooting magnification=−1.0) state.

As is obvious from these aberration diagrams according to Example 2, it is understood that the various aberrations such as spherical aberration, curvature of field, astigmatism and distortion are well corrected.

EXAMPLE 3

FIG. 5 is a view showing a configuration of an imaging lens SL3 according to Example 3. In the imaging lens SL3 in FIG. 5, a first lens group G1 is composed of, in order from an object side, a positive meniscus lens L11 with a convex surface directed to the object side, a negative meniscus lens L12 with a convex surface directed to the object side and a biconcave lens L13 having an aspherical surface on the image side. Further, a second lens group G2 is composed of, in order from the object side, a positive meniscus lens L21 with a convex surface directed to the object side and a cemented negative lens constructed by a positive meniscus lens L22 having an aspherical surface on the object side cemented with a biconcave lens L23. Moreover, a third lens group G3 is composed of, in order from the object side, an aperture stop S, a positive meniscus lens L31 with a convex surface directed to the image side, a biconvex lens L32, and a negative meniscus lens L33 with a convex surface directed to the object side.

The following table 3 shows various values of data according to Example 3.

TABLE 3

(Specifications)

f = 40.00
FNO = 2.88
ω = 19.50°
Y = 14.25
TL = 110.882
Bf = 46.008

(Lens Data)

| i | r | d | νd | nd |
|---|---|---|---|---|
| 1 | 24.1863 | 6.0000 | 28.69 | 1.795040 |
| 2 | 58.8750 | 1.0000 | | |
| 3 | 68.1995 | 2.0000 | 44.78 | 1.743997 |
| 4 | 13.4885 | 5.0000 | | |
| 5 | −387.5970 | 1.5000 | 60.29 | 1.620411 |
| *6 | 31.0506 | (d6) | | |
| 7 | 24.5747 | 3.0000 | 58.22 | 1.622990 |
| 8 | 471.9307 | 6.9485 | | |
| *9 | −112.8792 | 5.0000 | 49.61 | 1.772500 |
| 10 | −11.0458 | 2.0000 | 35.91 | 1.664460 |
| 11 | 205.9194 | (d11) | | |
| 12 | 0.0000 | 2.0000 | Aperture Stop S | |
| 13 | −248.9403 | 3.5000 | 64.12 | 1.516800 |
| 14 | −27.1694 | 0.2717 | | |
| 15 | 61.5115 | 3.5000 | 82.56 | 1.497820 |
| 16 | −55.2687 | 3.9511 | | |
| 17 | 23.7808 | 1.5000 | 31.59 | 1.756920 |
| 18 | 17.8693 | (Bf) | | |

(Aspherical Surface Data)

Surface Number = 6

κ = 3.6913
A4 = −4.44731E−05
A6 = 1.55016E−08
A8 = −8.34543E−10
A10 = 4.47883E−13

Surface Number = 9

κ = 71.6641
A4 = −4.22998E−05
A6 = 1.07281E−07
A8 = −3.85959E−09
A10 = 2.63986E−11

(Lens Group Data)

| Group | I | Focal Length |
|---|---|---|
| 1 | 1 | −28.00000 |
| 2 | 7 | 42.33763 |
| 3 | 12 | 36.70758 |

(Variable Distances)

| | INF | MID | CLD |
|---|---|---|---|
| β = | 0 | −0.5 | −1.0 |
| d0 = | ∞ | 44.4385 | 2.9546 |
| d6 = | 1.18314 | 9.52138 | 17.27378 |
| d11 = | 16.51911 | 10.89505 | 6.76689 |
| Bf = | 46.00839 | 48.68939 | 50.03265 |

(Values for Conditional Expressions)

(1)(−f1)/f0 = 0.700
(2)f2/f0 = 1.059
(3)f3/f0 = 0.918

TABLE 3-continued (4)X1/f0 = 0.259
(5)ΔD23/f0 = 0.253

Figure 6A:
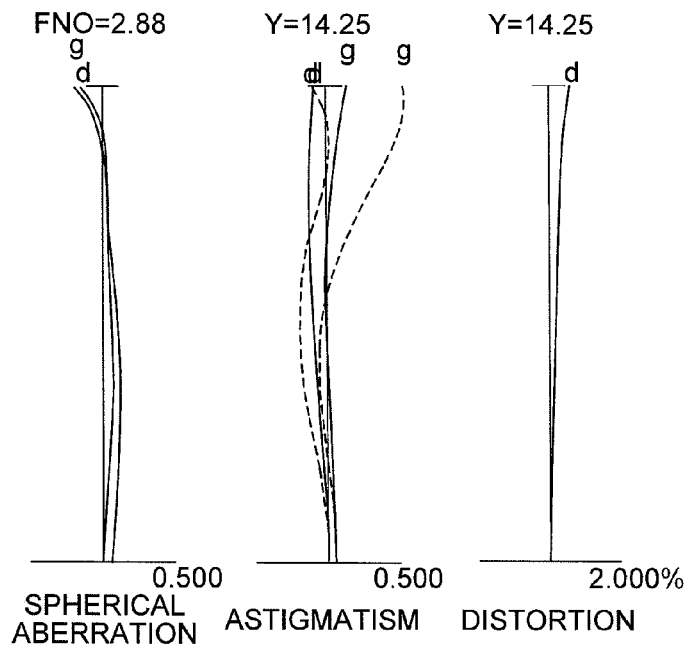
Figure 6B:
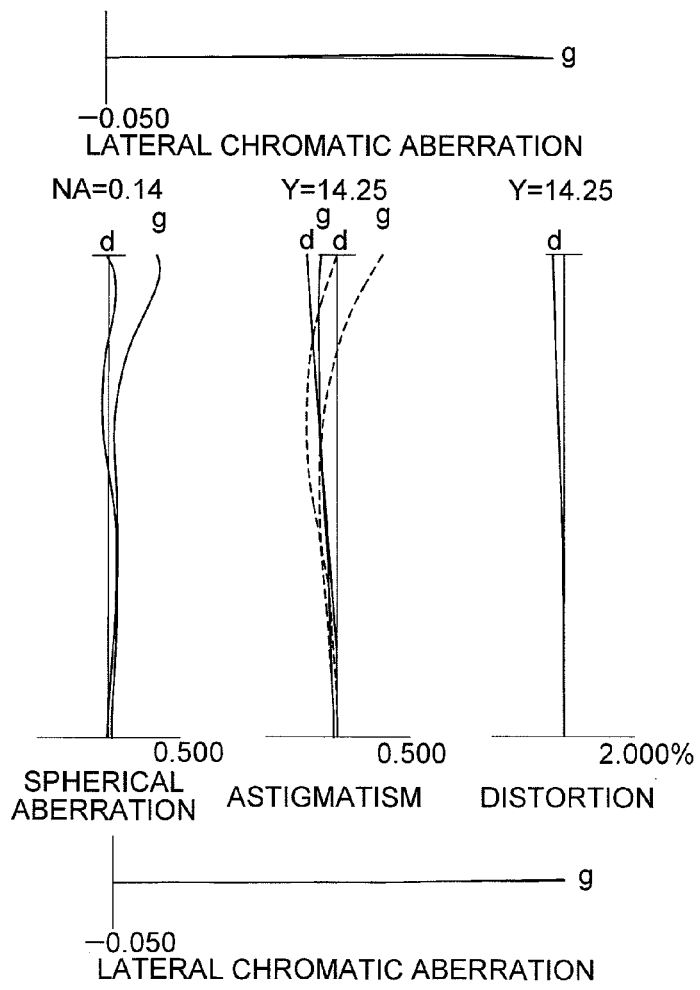

FIGS. 6A and 6B show various aberration diagrams in Example 3, in which FIG. 6A is an aberration diagram in the infinite-distance focusing state, and FIG. 6B is a diagram of various aberrations in the photographic life-size magnification (shooting magnification=−1.0) state.

As is obvious from these aberration diagrams, according to Example 3, it is understood that the various aberrations such as spherical aberration, curvature of field, astigmatism and distortion are well corrected.

EXAMPLE 4

Figure 7:
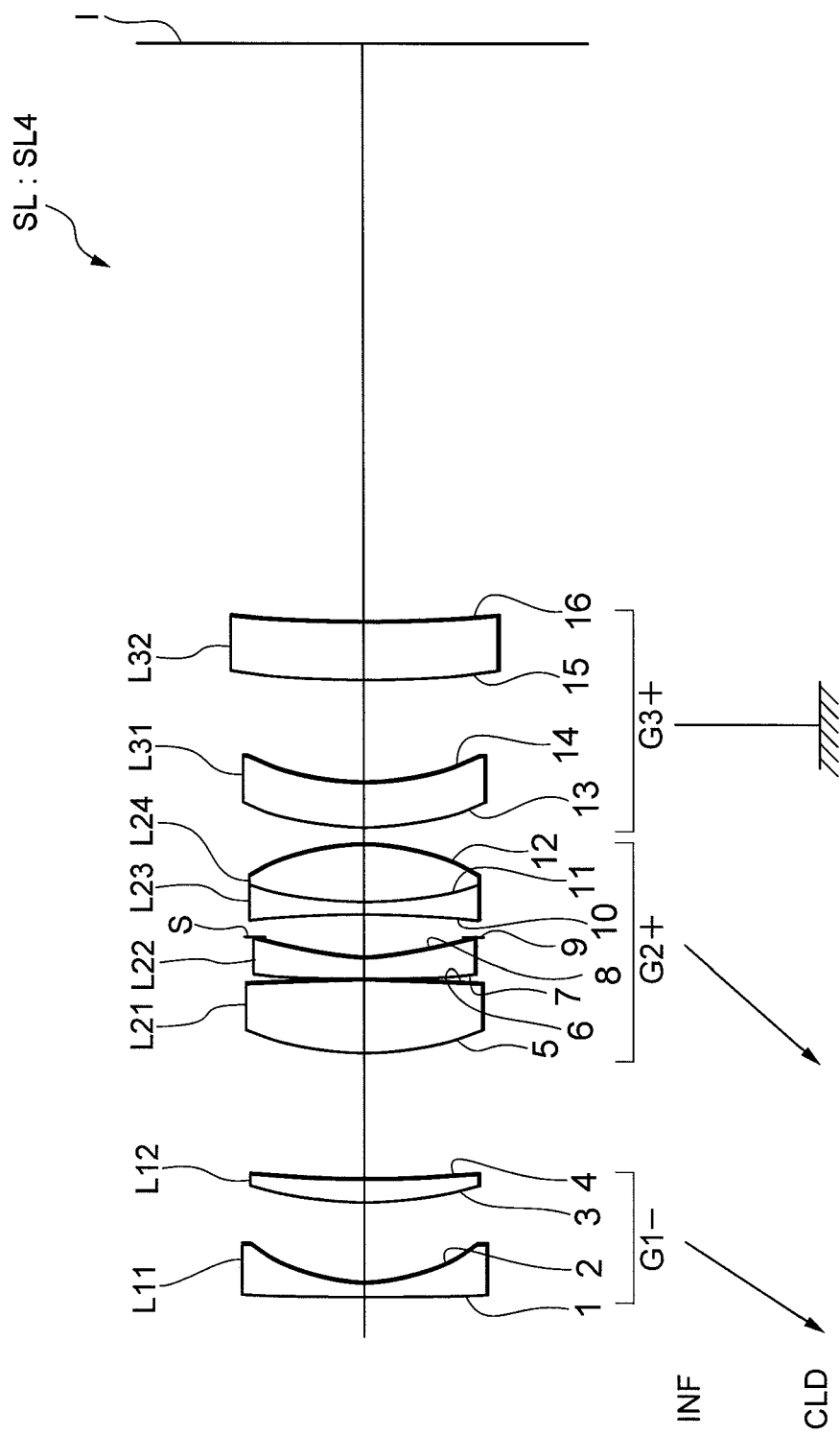
FIG. 7 is a sectional view showing a configuration of an imaging lens according to Example 4.

FIG. 7 is a view showing a configuration of an imaging lens SL4 according to Example 4. In the imaging lens SL4 in FIG. 7, a first lens group G1 is composed of, in order from an object side, a negative meniscus lens L11 with a convex surface directed to the object side, and a positive meniscus lens L12 with a convex surface directed to the object side. Further, a second lens group G2 is composed of, in order from the object side, a biconvex lens L21 having an aspherical surface on the image side, a negative meniscus lens L22 with a convex surface directed to the object side, an aperture stop S and a cemented lens constructed by a biconcave lens L23 cemented with a biconvex lens L24. Moreover, a third lens group G3 is composed of, in order from the object side, a negative meniscus lens L31 with a convex surface directed to the object side, and a positive meniscus lens L32 with a convex surface directed to the object side.

The following table 4 shows various values of data according to Example 4.

TABLE 4

(Specifications)

f = 40.00
FNO = 3.74
ω = 20.12°
Y = 14.25
TL = 85.011
Bf = 39.000

(Lens Data)

| i | r | d | νd | nd |
|---|---|---|---|---|
| 1 | 396.9772 | 0.9000 | 65.44 | 1.603001 |
| 2 | 15.2617 | 5.4721 | | |
| 3 | 33.4435 | 1.6072 | 48.51 | 1.697002 |
| 4 | 113.4239 | (d4) | | |
| 5 | 25.2480 | 4.9525 | 40.51 | 1.730770 |
| *6 | −94.5888 | 0.1000 | | |
| 7 | 150.3433 | 1.3478 | 45.89 | 1.548144 |
| 8 | 23.0988 | 1.3367 | | |
| 9 | 0.0000 | 1.6473 | Aperture Stop S | |
| 10 | −79.2718 | 0.9000 | 27.58 | 1.755201 |
| 11 | 33.0446 | 3.8964 | 66.22 | 1.526900 |
| 12 | −17.8207 | (d12) | | |
| 13 | 23.7631 | 3.0000 | 27.58 | 1.755201 |
| 14 | 21.2531 | 7.0818 | | |
| 15 | 86.0327 | 4.0000 | 60.32 | 1.620410 |
| 16 | 146.2019 | (Bf) | | |

(Aspherical Surface Data)

Surface Number = 6

κ = −42.1761
A4 = 1.35000E−05
A6 = −8.60540E−09
A8 = 1.95620E−10
A10 = −1.36120E−12

(Lens Group Data)

| Group | I | Focal Length |
|---|---|---|
| 1 | 1 | −49.26954 |
| 2 | 5 | 34.70319 |
| 3 | 13 | 930.13656 |

(Variable Distances)

| | INF | MID | CLD |
|---|---|---|---|
| β = | 0 | −0.5 | −1.0 |
| d0 = | ∞ | 96.9301 | 57.3148 |
| d4 = | 8.57623 | 8.50273 | 8.33020 |
| d12 = | 1.19345 | 25.76857 | 50.64488 |
| Bf = | 39.00001 | 39.00001 | 39.00008 |

(Values for Conditional Expressions)

(1)(−f1)/f0 = 1.232
(2)f2/f0 = 0.868
(3)f3/f0 = 23.253
(4)X1/f0 = 1.230
(5)ΔD23/f0 = −1.236

Figure 8A:
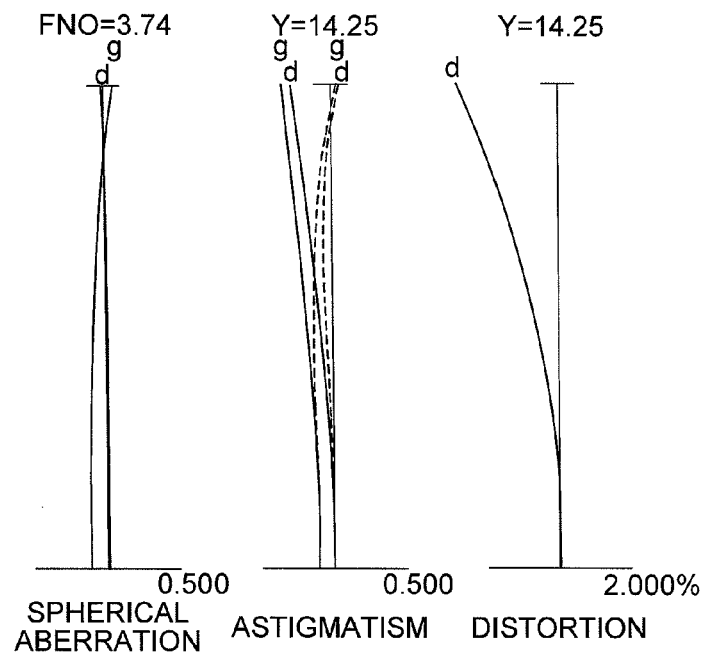
Figure 8B:
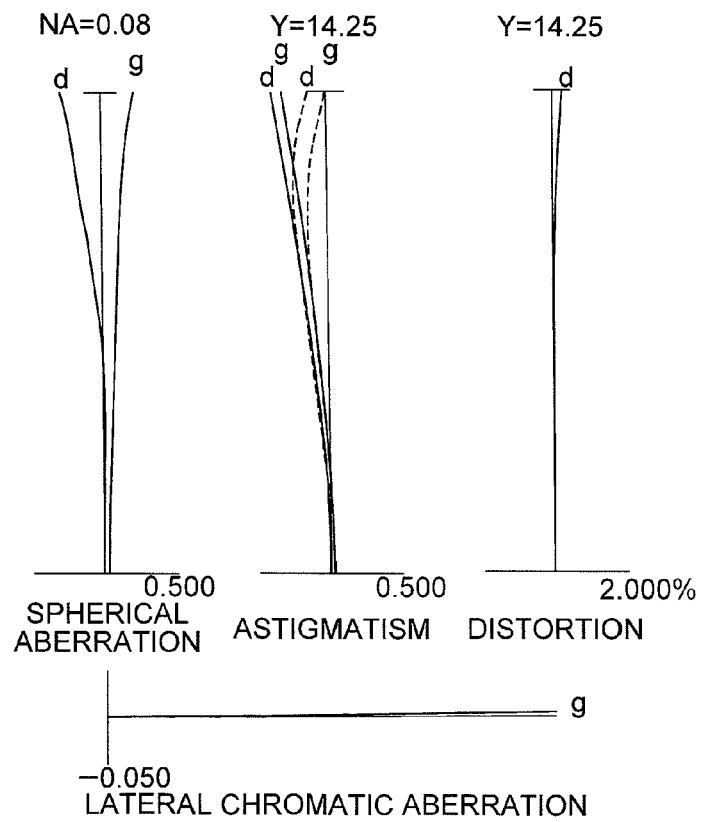

FIGS. 8A and 8B show various aberration diagrams in Example 4, in which FIG. 8A is an aberration diagram in the infinite-distance focusing state, and FIG. 8B is a diagram of various aberrations in the photographic life-size magnification (shooting magnification=−1.0) state.

As is obvious from these aberration diagrams, according to Example 4, it is understood that the various aberrations such as spherical aberration, curvature of field, astigmatism and distortion are well corrected.

EXAMPLE 5

FIG. 9 is a view showing a configuration of an imaging lens SL5 according to Example 5. In the imaging lens SL5 in FIG. 9, a first lens group G1 is composed of, in order from an object side, a biconcave lens L11 having an aspherical surface on the image side, and a biconvex lens L12. Further, a second lens group G2 is composed of, in order from the object side, a biconvex lens L21 having an aspherical surface on the image side, a biconcave lens L22, an aperture stop S and a cemented lens constructed by a biconcave lens L23 cemented with a biconvex lens L24. Moreover, a third lens group G3 is composed of, in order from the object side, a negative meniscus lens L31 with a convex surface directed to the object side, and a biconvex lens L32. The following table 5 shows various values of data according to Example 5.

TABLE 5

(Specifications)

f = 40.00
FNO = 3.29
ω = 20.90°
Y = 15.00
TL = 77.880
Bf = 39.620

(Lens Data)

| i | r | d | νd | nd |
|---|---|---|---|---|
| 1 | −273.7305 | 0.9000 | 56.75 | 1.607380 |
| *2 | 15.6446 | 3.1901 | | |
| 3 | 405.5452 | 2.6801 | 55.40 | 1.677900 |
| 4 | −43.7339 | (d4) | | |
| 5 | 29.7252 | 2.9229 | 44.78 | 1.743997 |
| *6 | −54.6146 | 2.9655 | | |
| 7 | −377.6456 | 0.9000 | 45.79 | 1.548141 |
| 8 | 22.4502 | 2.0000 | | |
| 9 | 0.0000 | 2.0000 | Aperture Stop S | |
| 10 | −195.5871 | 0.9000 | 29.52 | 1.717362 |
| 11 | 30.8796 | 3.8786 | 69.98 | 1.518601 |
| 12 | −17.6789 | (d12) | | |
| 13 | 22.8508 | 3.1301 | 27.51 | 1.755199 |
| 14 | 20.2392 | 1.8699 | | |
| 15 | 594.8761 | 1.5000 | 48.08 | 1.699998 |
| 16 | −540.1329 | (Bf) | | |

(Aspherical Surface Data)

Surface Number = 2

κ = 1.8565
A4 = −1.37950E−05
A6 = −2.17140E−07
A8 = −3.20370E−10
A10 = −1.66960E−11

Surface Number = 6

κ = 1.7046
A4 = 8.64930E−07
A6 = 2.14770E−11
A8 = 2.89660E−11
A10 = −7.70210E−14

(Lens Group Data)

| Group | I | Focal Length |
|---|---|---|
| 1 | 1 | −48.36594 |
| 2 | 5 | 32.84969 |
| 3 | 13 | 3674.38498 |

(Variable Distances)

| | INF | MID | CLD |
|---|---|---|---|
| β = | 0 | −0.5 | −1.0 |
| d0 = | ∞ | 98.5215 | 58.4851 |
| d4 = | 6.30494 | 6.15961 | 6.11646 |
| d12 = | 3.11840 | 26.20066 | 49.25650 |
| Bf = | 39.61907 | 39.61901 | 39.61887 |

(Values for Conditional Expressions)

(1)(−f1)/f0 = 1.209
(2)f2/f0 = 0.821
(3)f3/f0 = 91.860
(4)X1/f0 = 1.149
(5)ΔD23/f0 = −1.153

Figure 10A:
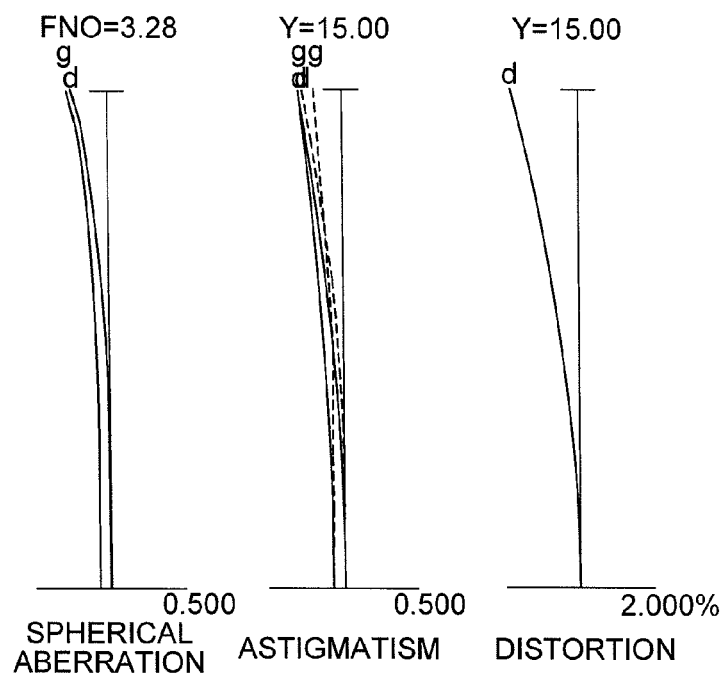
Figure 10B:
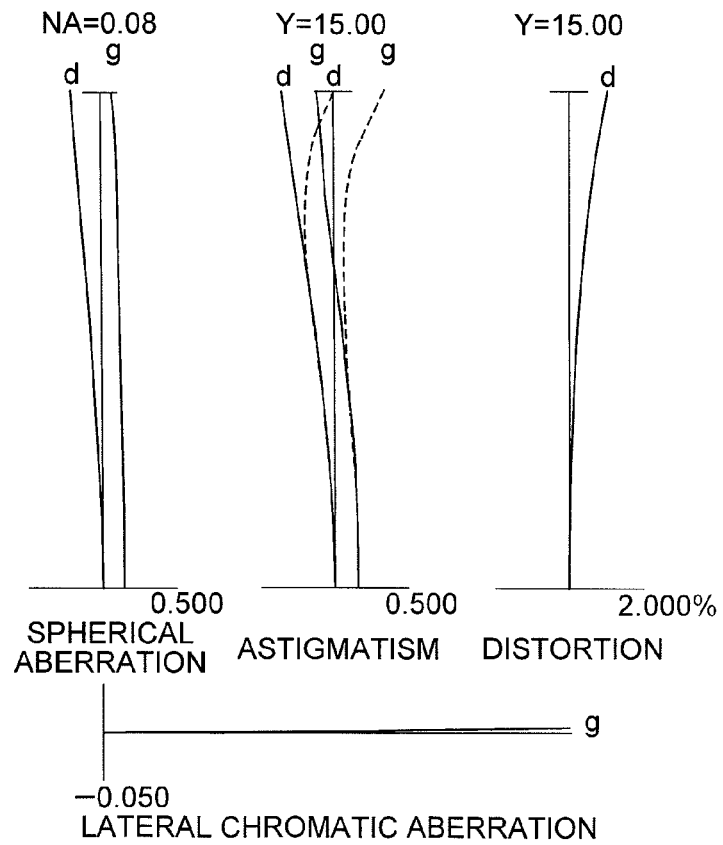

FIGS. 10A and 10B show various aberration diagrams in Example 5, in which FIG. 10A is an aberration diagram in the infinite-distance focusing state, and FIG. 10B is a diagram of various aberrations in the photographic life-size magnification (shooting magnification=−1.0) state.

As is obvious from these aberration diagrams, according to Example 5, it is understood that the various aberrations such as spherical aberration, curvature of field, astigmatism and distortion are well corrected.

According to the respective Examples discussed above, it is feasible to realize a compact imaging lens SL having an angle of view 2ω of about 39° to 40.2°, an f-number of about 2.8 to 3.7 and exhibiting a comparatively small moving amount for focusing, in which spherical aberration, curvature of field and astigmatism are corrected satisfactorily.

What is claimed is:

1. An imaging lens comprising, in order from an object side:
   a first lens group having negative refractive power;
   a second lens group having positive refractive power; and
   a third lens group having positive refractive power,
   upon focusing on a near-distance object point from an infinite-distance object point, at least one of said first lens group and said second lens group being moved so as to change a distance between said first lens group and said second lens group, and said imaging lens satisfying the following conditional expressions:

$0.2 < (-f1)/f0 < 1.7$ $0.05 < X1/f0 < 0.80$ where f1 denotes a focal length of said first lens group, f0 denotes a focal length of the imaging lens in an infinite-distance focusing state, a moving amount given upon moving to the object side from the image side takes a positive value, and X1 denotes a moving amount of said first lens group from the infinite-distance focusing state up to a photographic life-size maginification (magnification=−1.0) state, and
   wherein said first lens group includes at least one positive lens and one negative lens.

2. The imaging lens according to claim 1, wherein upon focusing on the near-distance object point from the infinite-distance object point, at least one of said first lens group and said second lens group is moved so as to expand the distance between said first lens group and said second lens group.

3. The imaging lens according to claim 1, wherein upon focusing on the near-distance object point from the infinite-distance object point, at least one of said second lens group and said third lens group is moved so as to narrow a distance between said second lens group and said third lens group.

4. The imaging lens according to claim 1, wherein said imaging lens satisfies the following conditional expression:

$0.4 < f2/f0 < 2.0$ where f2 denotes a focal length of said second lens group.

5. The imaging lens according to claim 1, wherein said imaging lens satisfies the following conditional expression:

$0.4 < f3/f0 < 100.0$ where f3 denotes a focal length of said third lens group.

6. The imaging lens according to claim 1, wherein said imaging lens satisfies the following conditional expression:

$0.5 < \Delta D23/f0 < 5.0$ where ΔD23 is a value obtained by subtracting a distance between the second lens group and the third lens group in the near-distance object point focusing state from a distance between the second lens group and the third lens group in the infinite-distance object point focusing state.

7. The imaging lens according to claim 1, wherein said first lens group includes at least one positive lens and two negative lenses.

8. The imaging lens according to claim 1, wherein said second lens group includes at least one aspherical lens.

9. The imaging lens according to claim 1, wherein said third lens group includes at least two positive lenses and one negative lens.

10. The imaging lens according to claim 1, wherein said second lens group moves to the image side from the object side upon focusing on the near-distance object point.

11. The imaging lens according to claim 1, wherein said second lens group is fixed with respect to the image plane upon focusing on the near-distance object point.

12. The imaging lens according to claim 1, wherein said third lens group includes a negative meniscus lens having a concave surface facing an image side.

13. The imaging lens according to claim 1, wherein an aperture stop is disposed between the second lens group and the third lens group.

14. The imaging lens according to claim 1, wherein upon focusing on the near-distance object point from the infinite-distance object point, an aperture stop is moved in a body with the third lens group.

15. The imaging lens according to claim 1, wherein an aperture stop is disposed in the second lens group.

16. The imaging lens according to claim 1, wherein upon focusing on the near-distance object point from the infinite-distance object point, an aperture stop is moved in a body with the second lens group.

17. An optical apparatus including said imaging lens according to claim 1.

18. The imaging lens according to claim 1, wherein said imaging lens satisfies the following conditional expression:

$$0.4 < f2/f0 < 1.25$$

where f2 denotes a focal length of said second lens group.

19. A method for manufacturing an imaging lens including, in order from an object side: a first lens group having negative refractive power; a second lens group having positive refractive power; and a third lens group having positive refractive power, said method comprising steps of:
disposing the first through third lens groups;
disposing the first lens group and the second lens group so that upon focusing on a near-distance object point from an infinite-distance object point, at least one of the first lens group and the second lens group is moved so as to change a distance between the first lens group and the second lens group;
disposing each lens group with satisfying the following conditional expressions:

$$0.2 < (-f1)/f0 < 1.7$$

$$0.05 < X1/f0 < 0.80$$

where f1 denotes a focal length of said first lens group, f0 denotes a focal length of the imaging lens in an infinite-distance focusing state, a moving amount given upon moving to the object side from the image side takes a positive value, and X1 denotes a moving amount of said first lens group from the infinite-distance focusing state up to a photographic life-size magnification (magnification=−1.0) state; and
disposing at least one positive lens and one negative lens into the first lens group.

20. The method according to claim 19,
wherein at least one of said first lens group and said second lens group is disposed to move so as to expand the distance between said first lens group and said second lens group upon focusing on the near-distance object point from the infinite-distance object point.

21. The method according to claim 19,
wherein at least one of said second lens group and said third lens group is disposed to move so as to narrow a distance between said second lens group and said third lens group upon focusing on the near-distance object point from the infinite-distance object point.

22. The method according to claim 19, further comprising a step of:
satisfying the following conditional expression:

$$0.4 < f2/f0 < 2.0$$

where f2 denotes a focal length of said second lens group.

23. The method according to claim 19, further comprising a step of:
satisfying the following conditional expression:

$$0.4 < f3/f0 < 100.0$$

where f3 denotes a focal length of said third lens group.

24. The method according to claim 19, further comprising a step of:
satisfying the following conditional expression:

$$0.5 < \Delta D23/f0 < 5.0$$

where $\Delta D23$ is a value obtained by subtracting a distance between the second lens group and the third lens group in the near-distance object point focusing state from a distance between the second lens group and the third lens group in the infinite-distance object point focusing state.

25. The method according to claim 19, further comprising a step of:
satisfying the following conditional expression:

$$0.4 < f2/f0 < 1.25$$

where f2 denotes a focal length of said second lens group.

26. An imaging lens comprising, in order from an object side:
a first lens group having negative refractive power;
a second lens group having positive refractive power; and
a third lens group having positive refractive power,
upon focusing on a near-distance object point from an infinite-distance object point, at least one of said first lens group and said second lens group being moved so as to change a distance between said first lens group and said second lens group, and said imaging lens satisfying the following conditional expressions:

$$0.2 < (-f1)/f0 < 1.7$$

$$0.5 < \Delta D23/f0 < 5.0$$

where f1 denotes a focal length of said first lens group, f0 denotes a focal length of the imaging lens in an infinite-distance focusing state, and $\Delta D23$ is a value obtained by subtracting a distance between the second lens group and the third lens group in the near-distance object point focusing state from a distance between the second lens group and the third lens group in the infinite-distance object point focusing state, and
wherein said first lens group includes at least one positive lens and one negative lens.

27. An imaging lens comprising, in order from an object side:

a first lens group having negative refractive power;

a second lens group having positive refractive power; and a third lens group having positive refractive power, said second lens group including at least one aspherical lens, upon focusing on a near-distance object point from an infinite-distance object point, at least one of said first lens group and said second lens group being moved so as to change a distance between said first lens group and said second lens group, and said imaging lens satisfying the following conditional expression:

$$0.2<(-f1)/f0<1.7$$

where f1 denotes a focal length of said first lens group, and f0 denotes a focal length of the imaging lens in an infinite-distance focusing state, and wherein said first lens group includes at least one positive lens and one negative lens.

28. A method for manufacturing an imaging lens including, in order from an object side: a first lens group having negative refractive power; a second lens group having positive refractive power; and a third lens group having positive refractive power, said method comprising steps of:

disposing the first through third lens groups;

disposing the first lens group and the second lens group so that upon focusing on a near-distance object point from an infinite-distance object point, at least one of the first lens group and the second lens group is moved so as to change a distance between the first lens group and the second lens group;

disposing each lens group with satisfying the following conditional expressions:

$$0.2<(-f1)/f0<1.7$$

$$0.5<\Delta D23/f0<5.0$$

where f1 denotes a focal length of said first lens group, f0 denotes a focal length of the imaging lens in an infinite-distance focusing state, and $\Delta D23$ is a value obtained by subtracting a distance between the second lens group and the third lens group in the near-distance object point focusing state from a distance between the second lens group and the third lens group in the infinite-distance object point focusing state; and disposing at least one positive lens and one negative lens into the first lens group.

29. A method for manufacturing an imaging lens including, in order from an object side: a first lens group having negative refractive power; a second lens group having positive refractive power; and a third lens group having positive refractive power, said method comprising steps of:

disposing the first through third lens groups;

disposing at least one aspherical lens in second lens group;

disposing the first lens group and the second lens group so that upon focusing on a near-distance object point from an infinite-distance object point, at least one of the first lens group and the second lens group is moved so as to change a distance between the first lens group and the second lens group;

disposing each lens group with satisfying the following conditional expression:

$$0.2<(-f1)/f0<1.7$$

where f1 denotes a focal length of said first lens group, and f0 denotes a focal length of the imaging lens in an infinite-distance focusing state; and disposing at least one positive lens and one negative lens into the first lens group.

* * * * *